United States Patent
Lee et al.

(10) Patent No.: US 10,887,383 B2
(45) Date of Patent: Jan. 5, 2021

(54) ELECTRONIC DEVICE AND APPLICATION SHARING METHOD THEREOF

(71) Applicant: Samsung Electronics Co., Ltd., Gyeonggi-do (KR)

(72) Inventors: Heui-Jin Lee, Gyeonggi-do (KR); Yun-Hyun Kim, Gyeonggi-do (KR); Sik Yoon, Gyeonggi-do (KR); Jae-Won Cho, Gyeonggi-do (KR); Su-Jin Kim, Gyeonggi-do (KR); Byeong-Jun Park, Gyeonggi-do (KR); Sung-Jin Lee, Gyeonggi-do (KR)

(73) Assignee: Samsung ELectronics Co., Ltd

(*) Notice: Subject to any disclaimer, the term of this patent is extended or adjusted under 35 U.S.C. 154(b) by 172 days.

(21) Appl. No.: 15/861,408

(22) Filed: Jan. 3, 2018

(65) Prior Publication Data

US 2018/0191816 A1 Jul. 5, 2018

(30) Foreign Application Priority Data

Jan. 4, 2017 (KR) .................. 10-2017-0001203
Jul. 17, 2017 (KR) .................. 10-2017-0090261

(51) Int. Cl.
*H04L 29/08* (2006.01)
*G06F 8/61* (2018.01)
(Continued)

(52) U.S. Cl.
CPC .............. *H04L 67/104* (2013.01); *G06F 8/61* (2013.01); *G06F 8/65* (2013.01); *H04L 67/10* (2013.01);
(Continued)

(58) Field of Classification Search
CPC ..... H04L 67/104; H04L 67/10; H04L 67/322; H04L 67/12; H04W 4/60; H04W 4/50; G06F 8/65; G06F 8/61
See application file for complete search history.

(56) References Cited

U.S. PATENT DOCUMENTS

2006/0010204 A1* 1/2006 Jalava .................. G06Q 10/10
709/205
2008/0154780 A1 6/2008 Soukup et al.
(Continued)

FOREIGN PATENT DOCUMENTS

EP 2 204 965 7/2010
JP 5464423 1/2014
(Continued)

OTHER PUBLICATIONS

European Search Report dated Jun. 4, 2018 issued in counterpart application No. 18150045.5-1218, 7 pages.
(Continued)

*Primary Examiner* — Soe Hlaing
(74) *Attorney, Agent, or Firm* — The Farrell Law Firm, P.C.

(57) ABSTRACT

An electronic device and an application sharing method thereof are provided. The electronic device includes a display; and a controller electrically connected to the display, wherein the controller is configured to receive first data which is partial data of entire data of an application from a first electronic device; and when a user agrees to use condition information of an application received from a second electronic device, receive second data which is remaining data of the entire data of the application from the second electronic device, and generate the entire data of the application.

14 Claims, 18 Drawing Sheets

(51) Int. Cl.
    *G06F 8/65*    (2018.01)
    *H04W 4/60*    (2018.01)
    *H04W 4/50*    (2018.01)

(52) U.S. Cl.
    CPC ............ *H04L 67/12* (2013.01); *H04L 67/322*
    (2013.01); *H04W 4/50* (2018.02); *H04W 4/60*
    (2018.02)

(56) References Cited

U.S. PATENT DOCUMENTS

| | | | |
|---|---|---|---|
| 2008/0228869 A1 | 9/2008 | Kraft et al. | |
| 2008/0235391 A1 | 9/2008 | Painter et al. | |
| 2009/0083394 A1 | 3/2009 | Diot et al. | |
| 2009/0228868 A1* | 9/2009 | Drukman | G06F 9/44505 |
| | | | 717/121 |
| 2012/0226738 A1 | 9/2012 | Taneja et al. | |
| 2013/0124619 A1* | 5/2013 | Steakley | G06F 8/61 |
| | | | 709/203 |
| 2013/0232038 A1* | 9/2013 | Murray | G06Q 30/00 |
| | | | 705/27.1 |
| 2013/0232229 A1* | 9/2013 | Firman | G06F 8/61 |
| | | | 709/219 |
| 2014/0237109 A1 | 8/2014 | Tiger et al. | |
| 2016/0234559 A1 | 8/2016 | Gobara | |
| 2016/0359931 A1 | 12/2016 | Goncharov et al. | |

FOREIGN PATENT DOCUMENTS

| | | |
|---|---|---|
| KR | 1020120009843 | 2/2012 |
| KR | 10-1299038 | 8/2013 |
| KR | 10-1329684 | 11/2013 |
| KR | 10-1612997 | 4/2016 |

OTHER PUBLICATIONS

International Search Report dated Apr. 9, 2018 issued in counterpart application No. PCT/KR2018/000194, 11 pages.

* cited by examiner

ELECTRONIC DEVICE AND APPLICATION SHARING METHOD THEREOF

PRIORITY

This application claims priority under 35 U.S.C. § 119(a) to Korean Patent Applications filed on Jan. 4, 2017 and Jul. 17, 2017 in the Korean Intellectual Property Office and assigned Serial Nos. 10-2017-0001203 and 10-2017-0090261, respectively, the entire disclosures of each of which are incorporated herein by reference.

BACKGROUND

1. Field of the Disclosure

The present disclosure relates generally to an electronic device and an application sharing method thereof, and more particularly, to an electronic device and an application sharing method, which installs an application without wasting network resources, does not require a data charge, guarantees compatibility of an installed application, and manages an update of an installed application.

2. Description of the Related Art

Application market services allow applications of sellers to be stored in a server, and may provide applications to purchasers who request the same, with reference to business logic designated by each of the application market services.

Due to protection of a developer's interests, maintenance of the security of a platform, and the like, an application market service prevents an application installation file, which is sold in an application market, from being stored in a place other than a server of which the security is maintained.

In addition, an application market service has a closed policy which never allows the installation of an application (the sharing of an installation file, etc.) which is brought through a path other than a formal server and a formal client. Accordingly, in order to install an application by using the application market service, a user must use an Internet connection through wireless fidelity (WiFi), a wireless operator network, or the like.

In a conventional application market service, a user may install an application only when the user uses a network connection. Therefore, it is difficult to use an application market service in an environment (e.g., India, Indonesia, etc.) in which a network connection is interrupted due to the lack of an infrastructure.

In addition, in a case of using a mobile network or a paid WiFi connection, when an application is downloaded from an application market service, a data charge proportional to the data size of the application may be required to be paid. When consideration is given to a situation where multiple users request the same application, if each user accesses a network to install the application, network resources may be unnecessarily wasted.

When an application is distributed offline in an attempt to overcome the above-described constraints, business logic (e.g., paid charging, addition of a purchase record, compatibility determination, digital rights management (DRM), etc.) of an application market service which is applied to a process for downloading the application by using the application market service cannot operate.

Accordingly, providers of conventional application market services may allow only a download using a network.

SUMMARY

An aspect of the present disclosure provides an electronic device and an application sharing method thereof, which may install an application without wasting network resources, without a burden of a data charge, and can guarantee the compatibility of the installed application and manage the update of the same.

Another aspect of the present disclosure provides an electronic device and an application sharing method thereof that allows the same application to share a part between two electronic devices having the relation of application compatibility (using the same platform), so as to prevent the two electronic devices from using, in an overlapping manner, network resources (WiFi, a mobile network, etc.) used to download an application from a server, thereby reducing the time and cost.

Another aspect of the present disclosure provides an electronic device and an application sharing method thereof that allows the same application to share a part between two electronic devices not having the relation of application compatibility (respectively using different platforms), so as to prevent the two electronic devices from using, in an overlapping manner, network resources (WiFi, a mobile network, etc.) used to download an application from a server, thereby reducing the time and cost.

Another aspect of the present disclosure provides an electronic device that may be connected to a different electronic device, which has already downloaded most data of an application, to perform reception, so as to allow the application to be installed even in a poor network environment.

Another aspect of the present disclosure provides an electronic device and an application sharing method thereof that may minimize security problems by storing partial data of an application in a storage place of which the security is maintained, and may identically perform an existing business logic in a process of installing a final application so as to utilize an existing system without modifying the same.

In accordance with an aspect of the present disclosure, an electronic device is provided. The electronic device includes a display; and a controller electrically connected to the display, wherein the controller is configured to receive first data which is partial data of entire data of an application from a first electronic device; and when a user agrees to use condition information of an application received from a second electronic device, receive second data which is remaining data of the entire data of the application from the second electronic device, and generate the entire data of the application.

In accordance with another aspect of the present disclosure, a method of an electronic device is provided. The method includes receiving first data which is partial data of entire data of an application from a first electronic device; and when a user agrees to use condition information of an application received from a second electronic device, receiving second data which is remaining data of the entire data of the application from the second electronic device, and generating the application.

BRIEF DESCRIPTION OF THE DRAWINGS

The above and other aspects, features, and advantages of the present disclosure will be more apparent from the following detailed description, taken in conjunction with the accompanying drawings, in which:

FIGS. 7A and 7B are illustrations of an operation of transmitting a shared application by an electronic device according to an embodiment of the present disclosure;

FIGS. 8A and 8B are illustrations of an operation of receiving a shared application by an electronic device according to an embodiment of the present disclosure;

DETAILED DESCRIPTION OF EMBODIMENTS OF THE PRESENT DISCLOSURE

Figure 1:
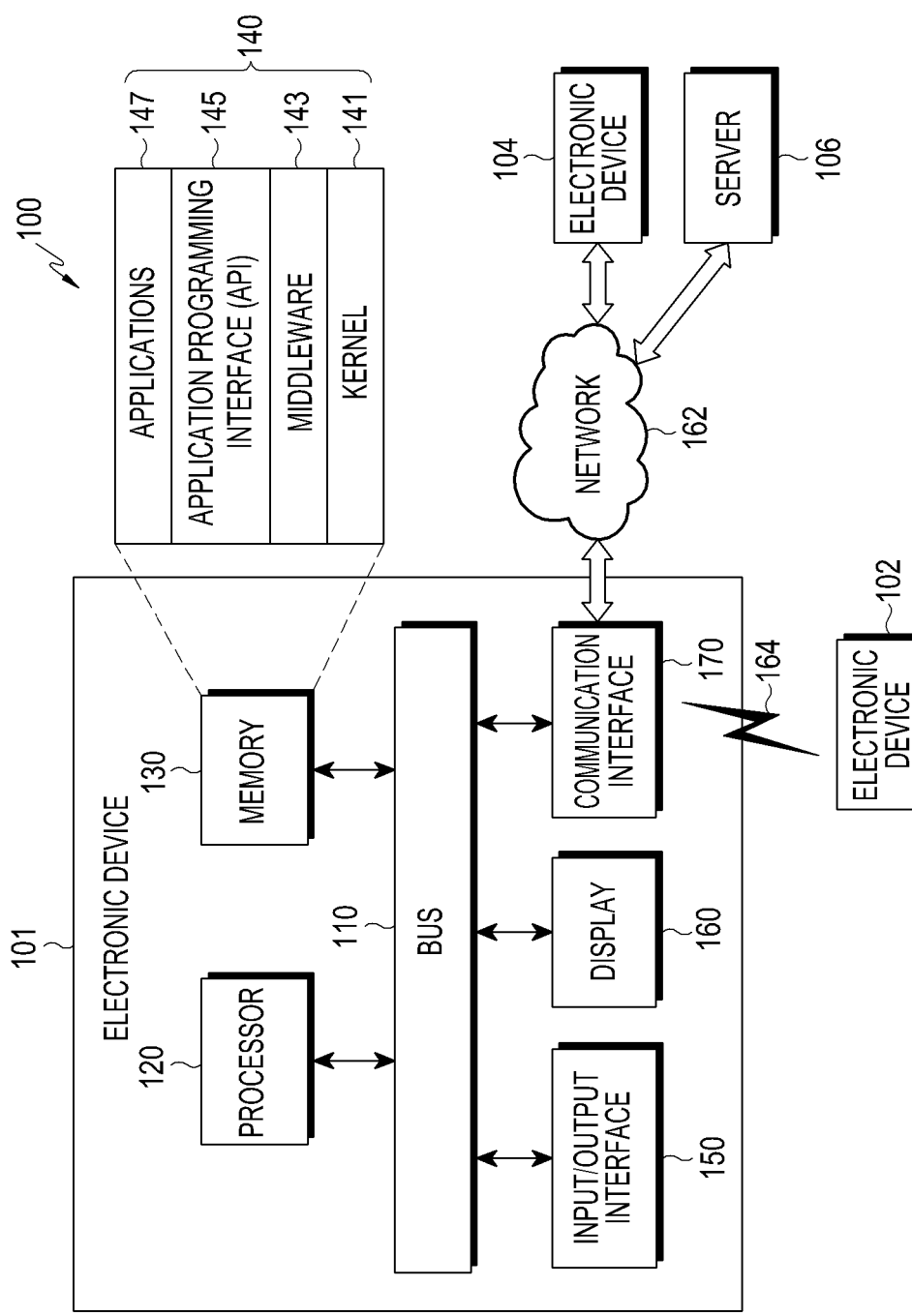
FIG. 1 is a block diagram of a network environment according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives within the scope of the present disclosure as defined by the appended claims. In describing the accompanying drawings, similar reference numerals may be used to designate similar elements.

As used herein, the expressions "have", "may have", "include", or "may include" refer to the existence of a corresponding feature (e.g., a numeral, a function, an operation, or an element such as a component), but do not exclude one or more additional features.

In the present disclosure, the expressions "A or B", "at least one of A and/or B", or "one or more of A and/or B" may include all possible combinations of the items listed. For example, the expressions "A or B", "at least one of A and B", or "at least one of A or B" refer to all of (1) including at least one A, (2) including at least one B, and (3) including all of at least one A and at least one B.

The expressions "a first", "a second", "the first", and "the second" used in various embodiments of the present disclosure may modify various elements regardless of order and/or importance, and are used only to distinguish one element from another element, but do not limit the corresponding elements. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being (operatively or communicatively) "connected," or "coupled," to another element (e.g., a second element), the element may be directly connected or coupled directly to the other element or any other element (e.g., a third element) may be interposed between them. In contrast, it may be understood that when an element (e.g., a first element) is referred to as being "directly connected," or "directly coupled" to another element (e.g., a second element), there is no element (e.g., a third element) interposed between them.

The expression "configured to" used in the present disclosure may be used interchangeably with, for example, the expressions "suitable for", "having the capacity to", "designed to", "adapted to", "made to", and "capable of" according to the situation. The term "configured to" may not necessarily imply "specifically designed to" in hardware. Alternatively, in some situations, the expression "device configured to" may indicate that the device, together with other devices or components, is able to. For example, the expression "processor adapted (or configured) to perform A, B, and C" may indicate a dedicated processor (e.g., an embedded processor) only for performing the corresponding operations or a general-purpose processor (e.g., a central processing unit (CPU) or an application processor (AP)) that may perform the corresponding operations by executing one or more software programs stored in a memory device.

The terms used herein are merely for the purpose of describing particular embodiments of the present disclosure but are not intended to limit the scope of the present disclosure. A singular expression may include a plural expression unless they are definitely different in context. Unless defined otherwise, all terms used herein, have the same meanings as those commonly understood by a person skilled in the art to which the present disclosure pertains. Such terms as those defined in a generally used dictionary may be interpreted to have the same meanings as the contextual meanings in the relevant field of the art, but are not to be interpreted to have ideal or excessively formal meanings unless clearly defined in the present disclosure. In some cases, even a term defined in the present disclosure should not be interpreted to exclude an embodiment of the present disclosure.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. According to an embodiment of the present disclosure, a wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or a tattoo), and a bio-implantable type (e.g., an implantable circuit).

According to an embodiment of the present disclosure, an electronic device may be a home appliance. A home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync®, Apple TV®, or Google TV™), a game console (e.g., Xbox® and PlayStation®), an electronic dictionary, an electronic key, a camcorder, and an electronic photo frame.

According to an embodiment of the present disclosure, an electronic device may include at least one of various medical devices (e.g., various portable medical measuring devices (a blood glucose monitoring device, a heart rate monitoring device, a blood pressure measuring device, a thermometer, etc.), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a vehicle infotainment device, electronic devices for a ship (e.g., a navigation device for a ship, and a gyrocompass), avionics, security devices, an automotive head unit, a robot for home or industry, an automated teller machine (ATM) in banks, a point-of-sale (POS) terminal in a shop, and an Internet-of-Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, an electronic device may include at least one of a part of a piece of furniture or a building/structure, an electronic board, an electronic signature receiving device, a projector, and various kinds of measuring instruments (e.g., a water meter, an electric meter, a gas meter, and a radio wave meter). An electronic device may be a combination of one or more of the above-described various devices. An electronic device may also be a flexible device. Further, an electronic device is not limited to the above-described devices, but may include an electronic device to be developed.

Hereinafter, an electronic device according to an embodiment of the present disclosure is described with reference to the accompanying drawings. In the present disclosure, the term "user" may indicate a person using an electronic device or a device (e.g. an artificial intelligence electronic device) using an electronic device.

FIG. 1 is a block diagram of a network environment 100 according to an embodiment of the present disclosure.

Referring to FIG. 1, the network 100 includes an electronic device 101. The electronic device 101 may include a bus 110, a processor 120, a memory 130, an input/output interface 150, a display 160, and a communication interface 170. In an embodiment of the present disclosure, at least one of the above elements of the electronic device 101 may be omitted or additional elements may be included.

The bus 110 may include, for example, a circuit that interconnects the elements 120, 130, 150, 160, and 170 and delivers a communication (e.g., a control message and/or data) between the elements 110 to 170.

The processor 120 may include one or more of a CPU, an AP, and a communication processor (CP). The processor 120 may perform, for example, calculations or process data related to control and/or communication by at least one of the other elements of the electronic device 101. The processor 120 may be referred to as a controller, may include a control circuit as a part thereof, and may be the control circuit.

The memory 130 may include a volatile memory and/or a non-volatile memory. The memory 130 may store, for example, commands or data related to at least one of the other elements of the electronic device 101. According to an embodiment of the present disclosure, the memory 130 may store software and/or a program 140. The program 140 may include, for example, a kernel 141, middleware 143, an application programming interface (API) 145, and/or applications 147. At least some of the kernel 141, the middleware 143, and the API 145 may be referred to as an operating system (OS).

For example, the kernel 141 may control or manage system resources (e.g., the bus 110, the processor 120, the memory 130, and the like) used to execute operations or functions implemented by the other programs (e.g., the middleware 143, the API 145, and the applications 147). In addition, the kernel 141 may provide an interface capable of controlling or managing system resources by accessing individual elements of the electronic device 101 by using the middleware 143, the API 145, or the applications 147.

For example, the middleware 143 may serve as an intermediary that enables the API 145 or the applications 147 to communicate with the kernel 141 and to exchange data therewith.

In addition, the middleware 143 may process one or more task requests received from the applications 147 according to a priority. For example, the middleware 143 may assign a priority, which enables the use of system resources (e.g., the bus 110, the processor 120, the memory 130, etc.) of the electronic device 101, to the applications 147. For example, the middleware 143 may perform scheduling, load balancing, or the like of the one or more task requests by processing the one or more task requests according to the priority assigned to the applications 147.

The API 145 is, for example, an interface through which the applications 147 control a function provided by the kernel 141 or the middleware 143, and may include, for example, at least one interface or function (e.g., a command) for file control, window control, image processing, character control, or the like.

For example, the input/output interface 150 may serve as an interface capable of delivering a command or data, which is input from a user or another external device, to the element(s) other than the input/output interface 150 within the electronic device 101. In addition, the input/output interface 150 may output, to a user or another external device, commands or data received from the element(s) other than the input/output interface 150 within the electronic device 101.

Examples of the display 160 may include a liquid crystal display (LCD), a light-emitting diode (LED) display, an organic LED (OLED) display, a microelectromechanical system (MEMS) display, and an electronic paper display. For example, the display 160 may display various pieces of content (e.g., text, images, videos, icons, symbols, etc.) to a user. The display 160 may include a touch screen, and may receive, for example, a touch input, a gesture input, a proximity input, or a hovering input provided by an electronic pen or a part of a user's body.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the second external electronic device 104 or the server 106. The communication interface 170 may include a CP, and the CP may be one of multiple modules of the communication interface 170. According to an embodiment of the present disclosure, the CP may also be included in the processor 120.

Wireless communication may use, as a cellular communication protocol, at least one of, for example, long-term evolution (LTE), LTE-Advanced (LTE-A), code division multiple access (CDMA), wideband CDMA (WCDMA), universal mobile telecommunications system (UMTS), wireless broadband (WiBro), and global system for mobile communications (GSM). In addition, wireless communication may include short-range communication 164. The short-range communication 164 may be performed by using at least one of, for example, WiFi, Bluetooth (BT), near field communication (NFC), and global navigation satellite system (GNSS). The GNSS may include at least one of, for example, a global positioning system (GPS), a global navigation satellite system (Glonass), a Beidou navigation satellite system (hereinafter Beidou), and a European global satellite-based navigation system (hereinafter Galileo), according to a use area, a bandwidth, and the like. Hereinafter, the term "GPS" may be used interchangeably with the term "GNSS." The types of wired communication may include at least one of, for example, a universal serial bus (USB), a high-definition multimedia interface (HDMI), recommended standard 232 (RS-232), and a plain old telephone service (POTS). The network 162 may include at least one of communication networks, such as a computer network (e.g., a local area network (LAN), or a wide area network (WAN)), the Internet, and a telephone network.

Each of the first and second external electronic devices 102 and 104 may be of a type identical to or different from that of the electronic device 101. According to an embodiment of the present disclosure, the server 106 may include one or more servers. All or some of the operations performed by the electronic device 101 may be performed by another electronic device or the first and second external electronic devices 102 and 104 and the server 106. When the electronic device 101 must perform some functions or services automatically or by a request, the electronic device 101 may send, to the first external electronic device 102, the second external electronic device 104, and the server 106, a request for performing at least some functions related to the functions or services, instead of performing the functions or services itself, or additionally. The first external electronic device 102, the second external electronic device 104, and the server 106 may execute the requested functions or the additional functions, and may deliver a result of the execution to the electronic device 101. The electronic device 101 may process the received result with or without any change and may provide the requested functions or services. To this end, use may be made of, for example, cloud computing technology, distributed computing technology, or client-server computing technology.

Figure 2:
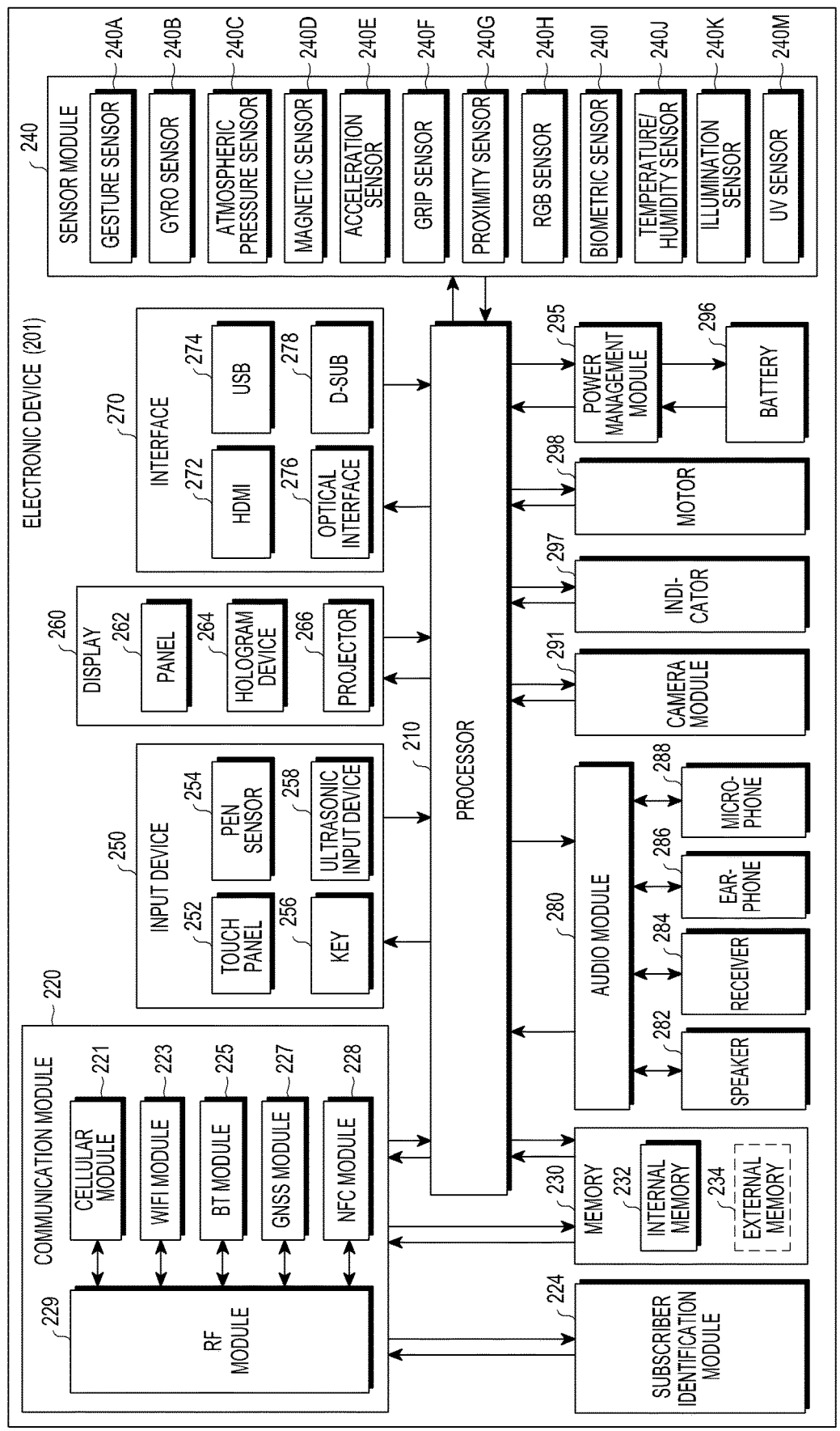
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include all or part of the electronic device 101 illustrated in FIG. 1. The electronic device 201 may include at least one processor (e.g., an AP) 210, a communication module 220, a memory 230, a sensor module 240, an input device 250, and a display 260, and may further include at least one of a subscriber identification module 224, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform the processing of and arithmetic operations on various data. The processor 210 may be implemented by, for example, a system on chip (SoC). According to an embodiment of the present disclosure, the processor 210 may further include a graphics processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include at least one of, for example, the cellular module 221, a WiFi module 223, a BT module 225, a GNSS module 227 (e.g., a GPS module, a Glonass module, a Beidou module, or a Galileo module), an NFC module 228, and a radio frequency (RF) module 229.

For example, the cellular module 221 may provide a voice call, a video call, a text message service, an Internet service, and the like through a communication network. According to an embodiment of the present disclosure, the cellular module 221 may identify or authenticate an electronic device 201 in the communication network by using the subscriber identification module (SIM) (e.g., a SIM card) 224. The cellular module 221 may perform at least some of the functions that the processor 210 may provide. The cellular module 221 may include a CP.

Each of the WiFi module 223, the BT module 225, the GNSS module 227, and the NFC module 228 may include, for example, a processor for processing data transmitted and received through the relevant module. According to an embodiment of the present disclosure, at least some (e.g., two or more) of the cellular module 221, the WiFi module 223, the BT module 225, the GNSS module 227, and the NFC module 228 may be included in one integrated circuit (IC) or IC package.

The RF module 229 may transmit and receive, for example, communication signals (e.g., RF signals). The RF module 229 may include, for example, a transceiver, a power amplifier module (PAM), a frequency filter, a low noise amplifier (LNA), and an antenna. According to an embodiment of the present disclosure, at least one of the cellular module 221, the WiFi module 223, the BT module 225, the GNSS module 227, and the NFC module 228 may transmit and receive RF signals through a separate RF module.

The SIM 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 may include, for example, an internal memory 232 and/or an external memory 234. The internal memory 232 may include at least one of, for example, a volatile memory (e.g., a dynamic random access memory (DRAM), a static RAM (SRAM), a synchronous DRAM (SDRAM), etc.); and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NOT AND (NAND) flash memory, a NOT OR (NOR) flash memory, etc.), a hard drive, and a solid state drive (SSD)).

The external memory 234 may further include a flash drive, for example, a compact flash (CF) drive, a secure digital (SD) drive, a micro SD (Micro-SD) drive, a mini SD (Mini-SD) drive, an extreme digital (xD), a multimedia card (MMC), a memory stick, and the like. The external memory 234 may be functionally and/or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor), a biometric sensor 240I, a temperature/humidity sensor 240J, an illumination sensor 240K, and an ultraviolet (UV) light sensor 240M. Additionally or alternatively, the sensor module 240 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor configured to control the sensor module 240 as a part of or separately from the processor 210, and may control the sensor module 240 while the processor 210 is in a reduced power (e.g., sleep) state.

The input apparatus 250 may include, for example, a touch panel 252, and may further include at least one of a (digital) pen sensor 254, a key 256, and an ultrasonic input device 258. The touch panel 252 may use at least one of, for example, a capacitive scheme, a resistive scheme, an infrared scheme, and an acoustic wave scheme. In addition, the touch panel 252 may further include a control circuit. The touch panel 252 may further include a tactile layer and may provide a tactile response to a user.

The (digital) pen sensor 254 may include, for example, a recognition sheet which is a part of the touch panel 252 or is separated from the touch panel 252. The key 256 may be, for example, a physical button, an optical key, and a keypad. The ultrasonic input device 258 may sense an ultrasonic wave generated by an input means through a microphone 288, and may confirm data corresponding to the sensed ultrasonic wave.

The display 260 may include a panel 262, and may further include a hologram device 264, and/or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may display a three-dimensional image in the air by using the interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include at least one of, for example, an HDMI 272, a USB 274, an optical interface 276, and a D-subminiature (D-sub) connector 278. The interface 270 may be included in, for example, the communication interface 170 illustrated in FIG. 1. Additionally or alternatively, the interface 270 may include, for example, a mobile high-definition link (MHL) interface, SD card/multimedia card (MMC) interface, or a standard interface of the Infrared Data Association (IrDA).

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, and the like.

The camera module 291 is, for example, a device capable of capturing a still image and a moving image. According to an embodiment of the present disclosure, the camera module 291 may include one or more image sensors (e.g., a front sensor or a back sensor), a lens, an image signal processor (ISP), and a flash (e.g., an LED, a xenon lamp, or the like).

The power management module 295 may manage, for example, power of the electronic device 201. According to an embodiment of the present disclosure, the power management module 295 may include a power management IC (PMIC), a charger IC, or a battery gauge. The PMIC may use a wired and/or a wireless charging method. Examples of a wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during charging. The battery 296 may include, for example, a rechargeable battery and/or a solar battery.

The indicator 297 may display a particular state (e.g., a booting state, a message state, a charging state, and the like) of the electronic device 201 or a part (e.g., the processor 210) of the electronic device 201. The motor 298 may convert an electrical signal into a mechanical vibration, and may generate a vibration, a haptic effect, and the like. The electronic device 201 may include a processing unit (e.g., a GPU) for supporting a mobile television (TV). A processing unit for supporting a mobile TV may process media data according to a standard, such as, for example, digital multimedia broadcasting (DMB), digital video broadcasting (DVB), or mediaFLO™.

Each of the above-described elements according to the present disclosure may be configured with one or more components, and the names of the corresponding elements may vary based on a type of an electronic device. An electronic device according to an embodiment of the present disclosure may include at least one of the above-described elements. Some elements may be omitted or other additional elements may be further included in an electronic device. In addition, some of the elements of an electronic device may be combined into one entity, which may perform functions identical to those of the relevant elements before the combination.

Figure 3:
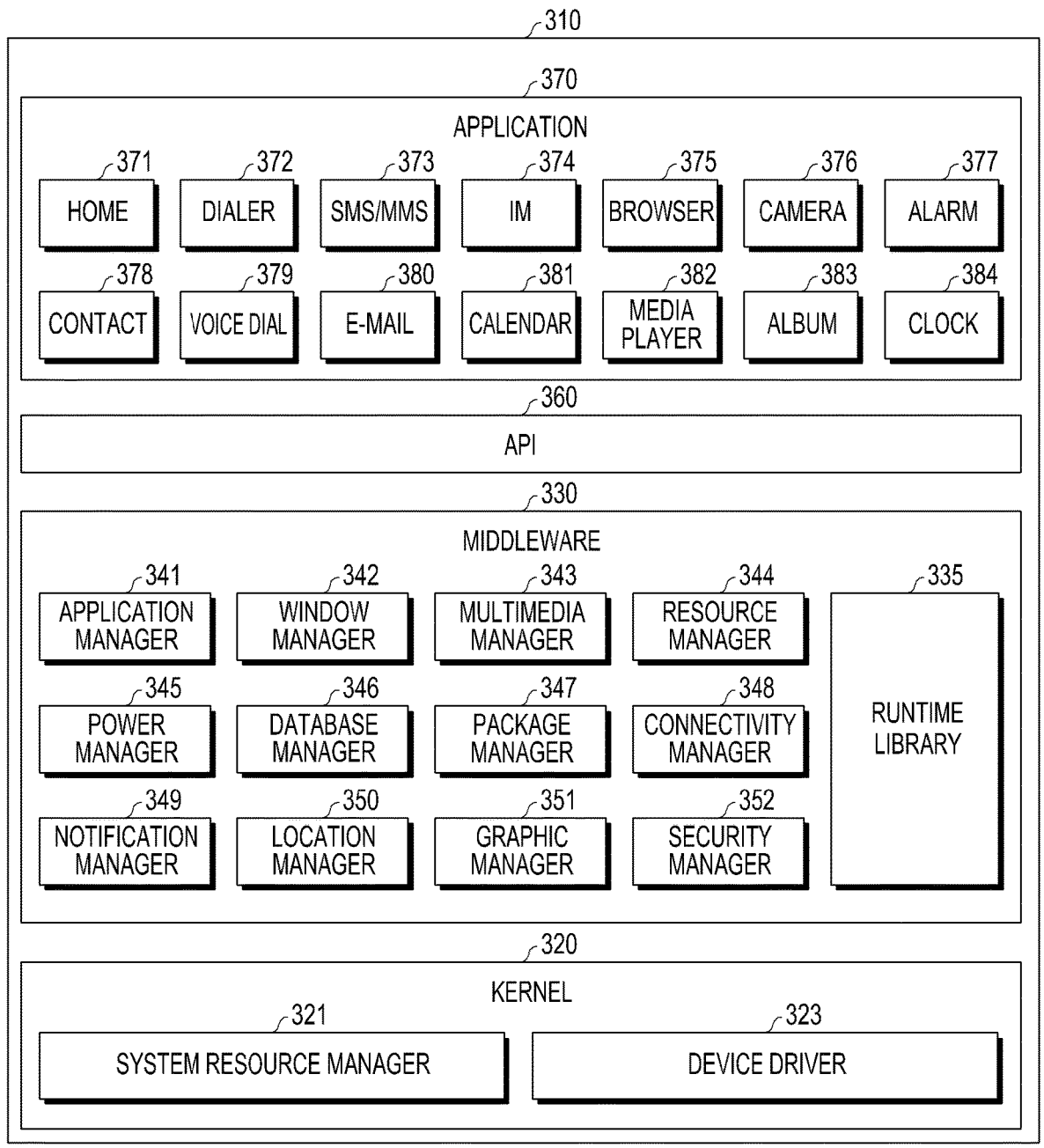
FIG. 3 is a block diagram of a program module according to an embodiment of the present disclosure.

FIG. 3 is a block diagram of a program module according to an embodiment of the present disclosure.

Referring to FIG. 3, the program module 310 may include an OS for controlling resources related to an electronic device 101 and/or various applications (e.g., the applications 147) executed in the OS. An OS may be, for example, Android®, iOS®, Windows®, Symbian®, Tizen®, Bada™, and the like.

The program module 310 may include a kernel 320, middleware 330, an API 360, and/or an application 370. At least some of the program module 310 may be preloaded on an electronic device, or may be downloaded from the electronic device 102 or 104, or the server 106.

The kernel 320 may include, for example, a system resource manager 321 and/or a device driver 323. The system resource manager 321 may perform control, allocation, retrieval, and the like of system resources. According to an embodiment of the present disclosure, the system resource manager 321 may include a process management circuit, a memory management circuit, a file system management circuit, and the like. The device driver 323 may include, for example, a display driver, a camera driver, a BT driver, a shared memory driver, a USB driver, a keypad driver, a WiFi driver, an audio driver, or an inter-process communication (IPC) driver.

For example, the middleware 330 may provide a function required in common by the application 370, or may provide various functions to the application 370 through the API 360 so as to enable the application 370 to efficiently use limited system resources within an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, functionality for an arithmetic function, and the like.

The application manager 341 may manage, for example, a life cycle of at least one of the applications of the application 370. The window manager 342 may manage graphical user interface (GUI) resources used for a screen. The multimedia manager 343 may determine formats required to reproduce various media files, and may encode or decode a media file by using a coder/decoder (codec) appropriate for the relevant format. The resource manager 344 may manage resources, such as source code of at least one of the applications 370, a memory or storage space for at least one of the applications 370, and the like.

For example, the power manager 345 may operate with a basic input/output system (BIOS), etc. and may manage a battery or power, and may provide power information and the like required for an operation of an electronic device. The database manager 346 may generate, search, or change a database to be used by at least one of the applications 370. The package manager 347 may manage an installation or update of an application distributed in the form of a package file.

The connectivity manager 348 may manage a wireless connection, such as, for example, WiFi or BT. The notification manager 349 may display or notify of an event, such as an arrival of a message, an appointment, a proximity notification, and the like, in such a manner as to not disturb a user. The location manager 350 may manage location information of an electronic device. The graphic manager 351 may manage a graphic effect, which is to be provided to a user, or a user interface related to the graphic effect. The security manager 352 may provide various security functions required for system security, user authentication, and the like. According to an embodiment of the present disclosure, when an electronic device 101 has a telephone call function, the middleware 330 may further include a telephony manager for managing a voice call function or a video call function of the electronic device.

The middleware 330 may include a middleware module that combines various functions of the above-described elements. The middleware 330 may provide a module specialized for each type of OS in order to provide a differentiated function. In addition, the middleware 330 may dynamically delete some of the existing elements, or may add new elements.

The API 360 is, for example, a set of API programming functions, and may be provided with a different configuration according to a type of an OS. For example, in the case of Android® or iOS®, one API set may be provided for each platform. In the case of Tizen®, two or more API sets may be provided for each platform.

The application 370 may include one or more applications capable of performing functions, such as, for example, a home application 371, a dialer application 372, an short messaging service/multimedia messaging service (SMS/MMS) application 373, an instant message (IM) application 374, a browser application 375, a camera application 376, an alarm application 377, a contact application 378, a voice dialer application 379, an email application 380, a calendar application 381, a media player application 382, an album application 383, a clock application 384, health care application (e.g., which measures a quantity of exercise, a blood sugar level, and the like), and providing environmental information (e.g., information on atmospheric pressure, humidity, temperature, and the like).

According to an embodiment of the present disclosure, the application 370 may include an information exchange application supporting information exchange between an electronic device 101 and an electronic device 102 or 104. The information exchange application may include, for example, a notification relay application for delivering certain information to an external electronic device or a device management application for managing an external electronic device.

For example, a notification relay application may include a function for delivering, to the electronic device 102 or 104, notification information generated by the other applications (e.g., the SMS/MMS application 373, the email application 380, the health care application, the environmental information application, etc.) of the electronic device 101. In addition, for example, the notification relay application may receive notification information from an external electronic device and provide the received notification information to a user.

The device management application may manage (e.g., install, delete, or update), for example, at least one function (e.g., turning on/off the external electronic device (or some elements thereof) or adjusting the brightness (or resolution) of the display) of the electronic device 102 or 104 communicating with the electronic device, an application executed in the external electronic device, or a service (e.g., a telephone call service, a message service, and the like) provided by the electronic device.

According to an embodiment of the present disclosure, the application 370 may include an application (e.g., a health care application of a mobile medical device and the like) designated according to an attribute of the electronic device 102 or the electronic device 104. The application 370 may include an application received from the server 106, the electronic device 102, or the electronic device 104. The application 370 may include a preloaded application or a third party application which may be downloaded from a server. The names of the elements of the program module 310 may vary according to a type of OS.

According to an embodiment of the present disclosure, at least part of the program module 310 may be implemented in software, firmware, hardware, or a combination of two or more thereof. At least part of the program module 310 may be implemented (for example, executed) by, for example, a processor 210. At least part of the program module 310 may include, for example, a module, a program, a routine, a set of instructions, and a process for performing one or more functions.

FIGS. 4A to 4E are illustrations of an operation of sharing an application in an application sharing system according to an embodiment of the present disclosure.

Referring to FIGS. 4A to 4E, the application sharing system may include an application storage unit 100, an application market service server 200, a first electronic device 300, and at least one second electronic device 400.

The application storage unit 100 may store a physical application, pieces of application-related information, and information of an electronic device that downloads an application. In a case of a physical application, the entire data of one application and first data, which is partial data of the entire data thereof, may be stored. The application market service server 200 (the server 106 or electronic device 104 of FIG. 1, hereinafter referred to as a server) according to an embodiment of the present disclosure may be connected to an electronic device using a market service through the Internet so as to perform business logic, including settlement, security, compatibility determination, and the like, and may finally give a user of the electronic device a right to download and install an application stored in the application storage unit 100.

Figure 4A:
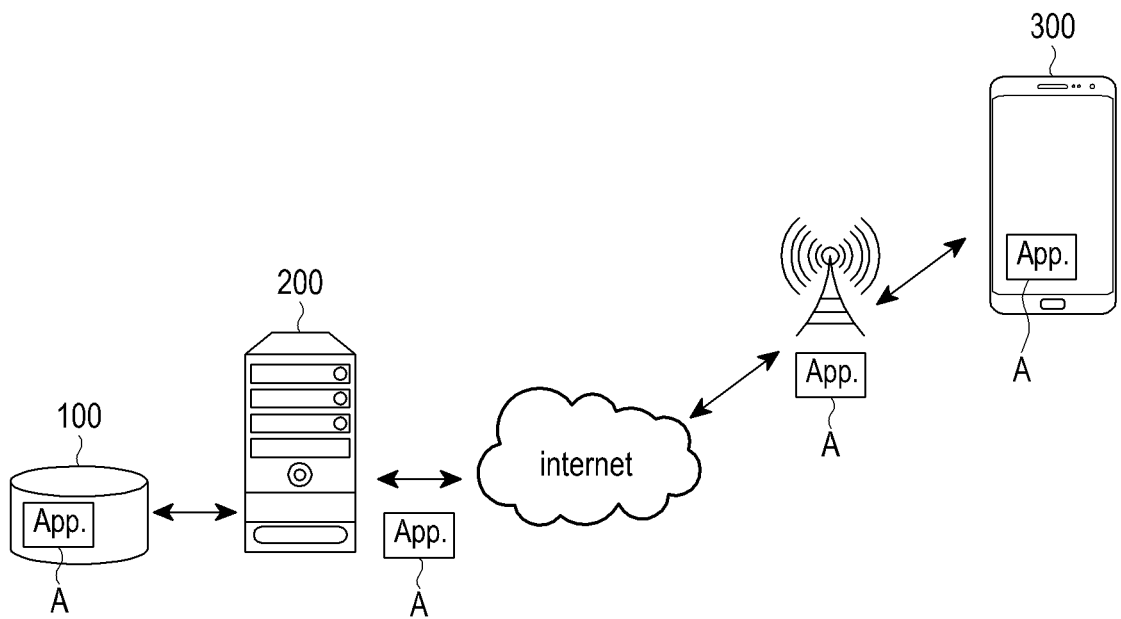
FIGS. 4A, 4B, 4C, 4D, and 4E are illustrations of an operation of sharing an application in an application sharing system according to an embodiment of the present disclosure.

As illustrated in FIG. 4A, the server 200 may be connected to the first electronic device 300 through the Internet, and when the first electronic device 300 sends a request for downloading a first application A to the server 200, may perform the business logic and then may transmit the first application A, which is stored in the application storage unit 100, to the first electronic device 300.

According to an embodiment of the present disclosure, the server 200 may transmit the entire data of the first application A to the first electronic device 300 at a request of the first electronic device 300, or may transmit only first data a1, which is partial data of the entire data of the first application A, to the first electronic device 300.

According to an embodiment of the present disclosure, when the first electronic device 300 sends a request for checking update information of the first application A to the server 200, the server 200 may transmit final update information of the first application A to the first electronic device 300.

Figure 4B:
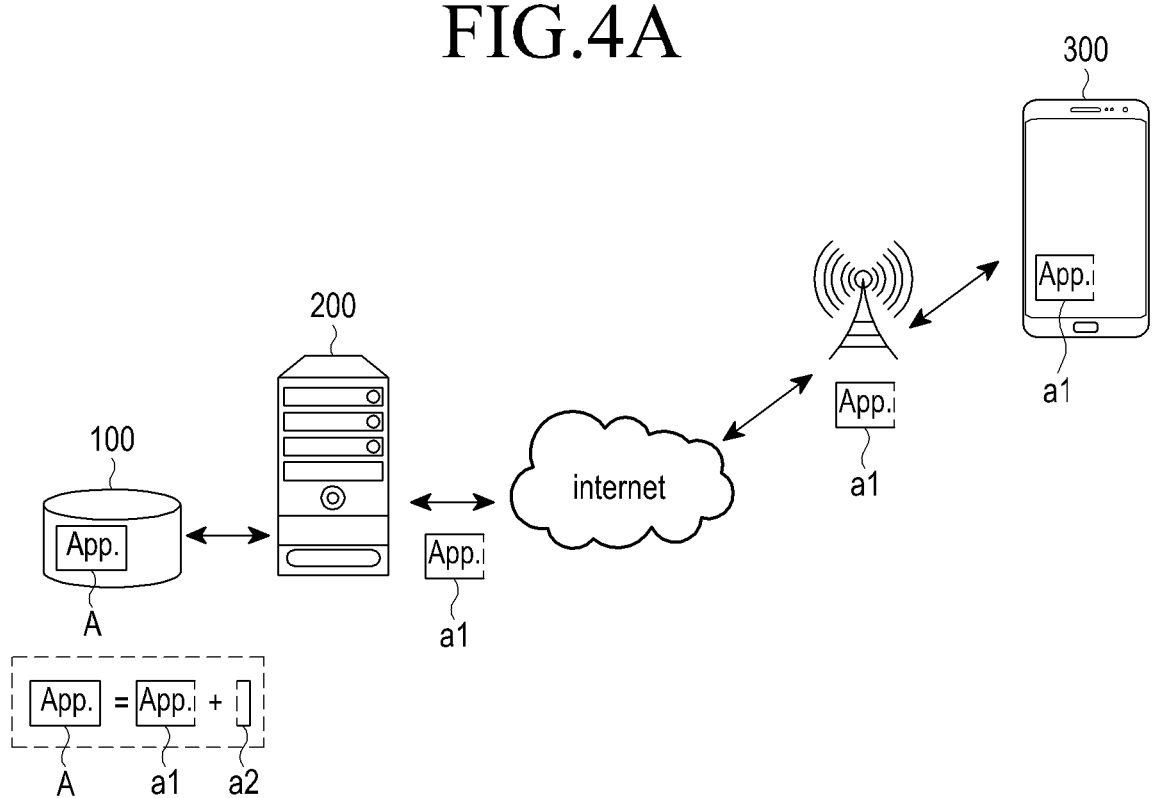
Figure 4C:
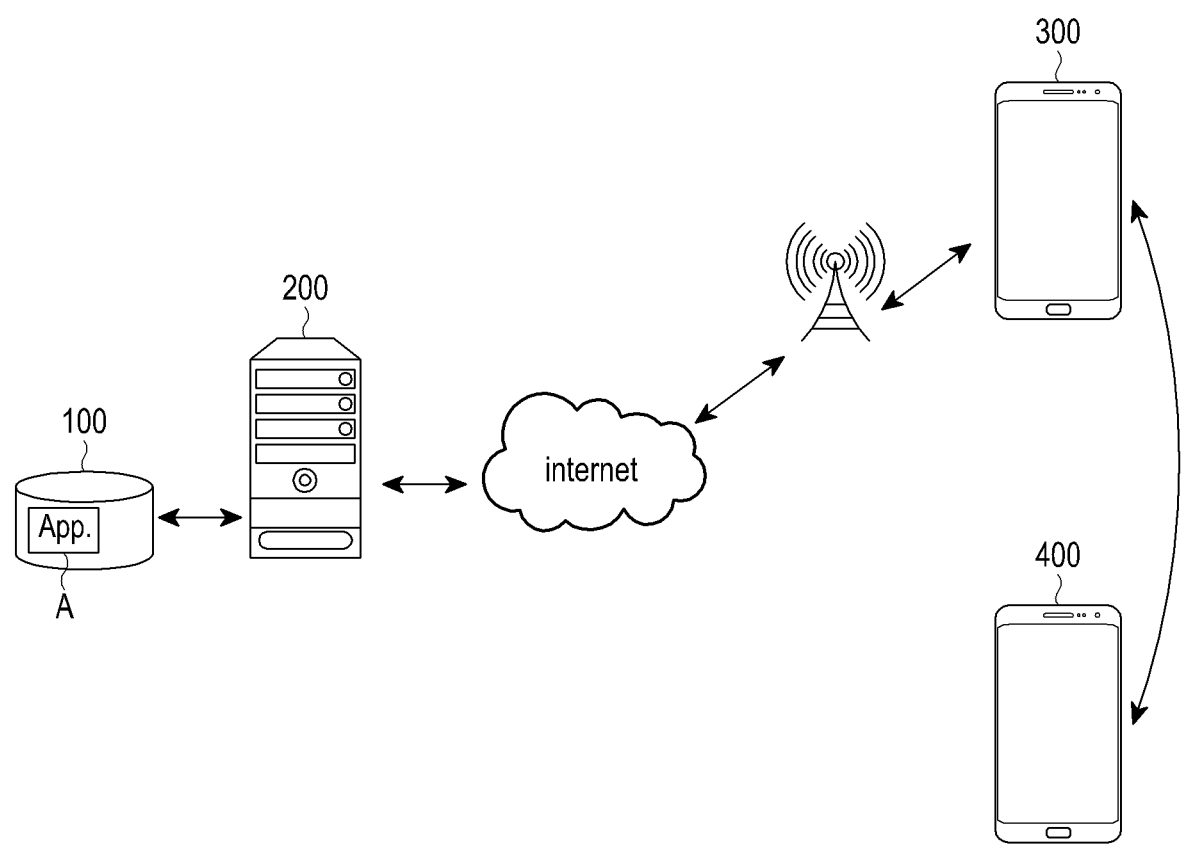
Figure 4D:
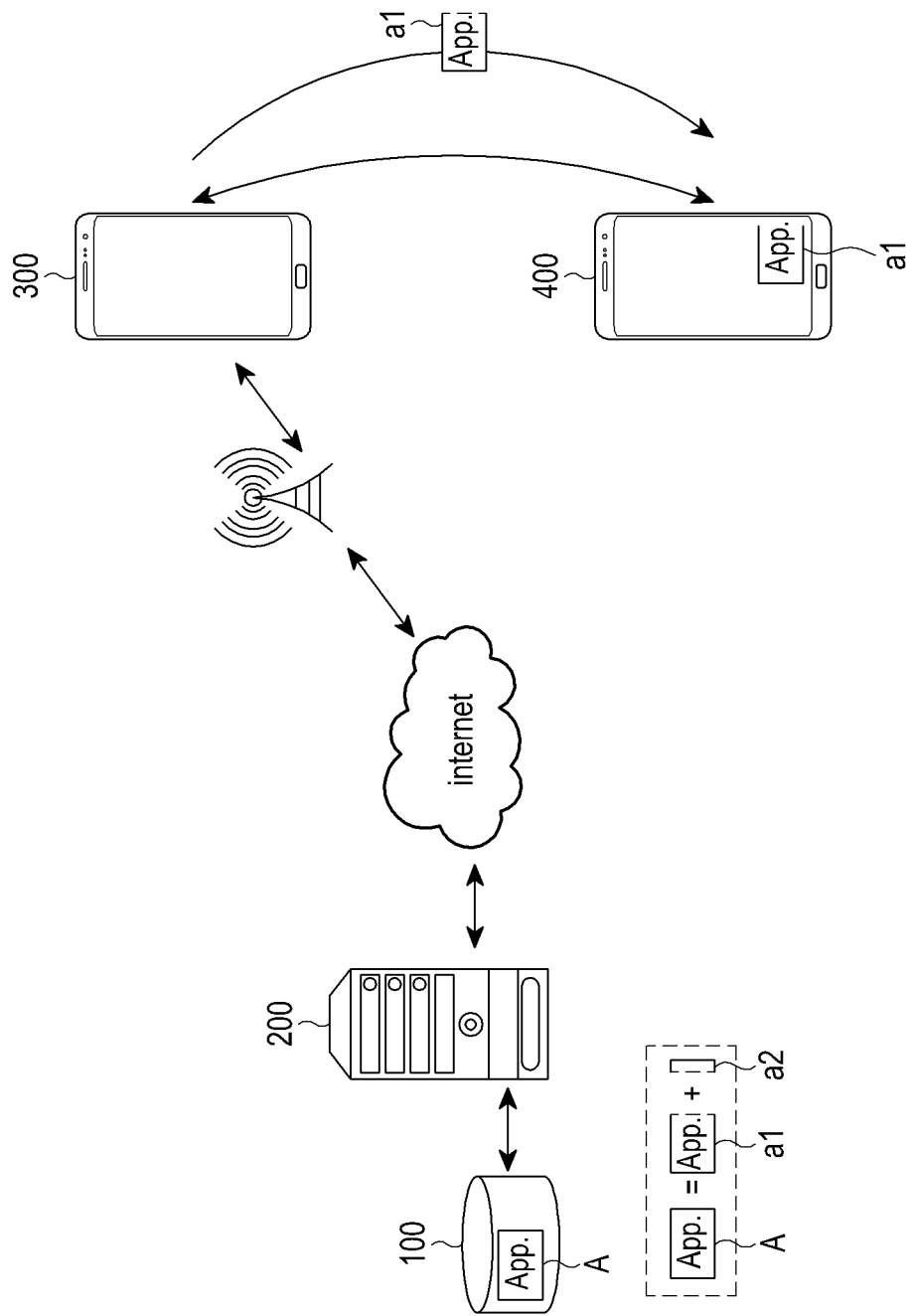
Figure 4E:
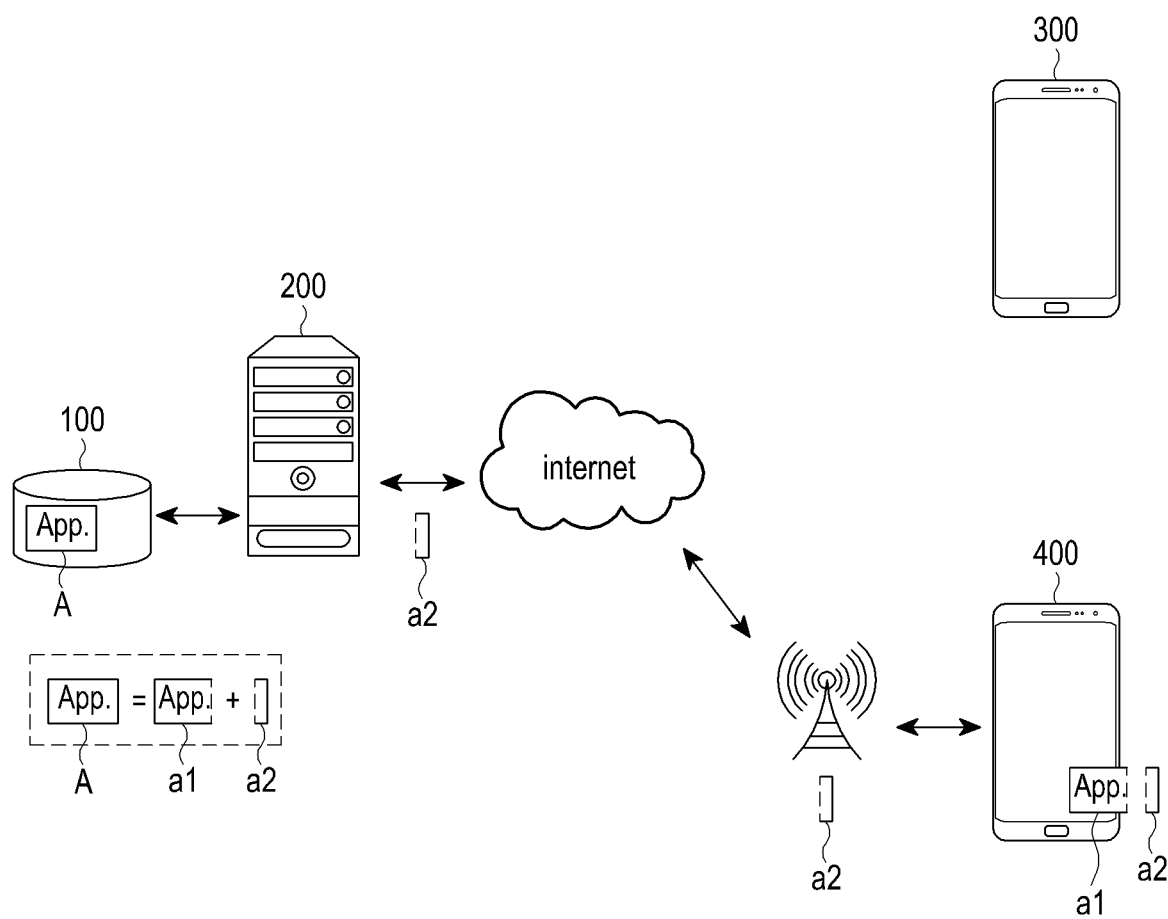

According to an embodiment of the present disclosure, as illustrated in FIG. 4E, the server 200 may be connected to the second electronic device 400 through the Internet, and when information of the first application A is requested, may transmit, to the second electronic device 400, use condition information for execution of the business logic. The use condition information may include at least one piece of information among a user's right, paid information, permission information, and application information.

According to an embodiment of the present disclosure, after the server 200 receives, from the second electronic device 400, information representing agreement to the use condition, when a request is made for second data a2 which is the remaining data except for the first data a1 of the entire data of the first application A, the server 200 may perform the business logic, and may finally detect the second data a2, which is the remaining data except for the first data a1 of the entire data of the first application A stored in the application storage unit 100, to transmit the same to the second electronic device 400. The server 200 may transmit, to the second electronic device 400, DRM information together with the second data a2 of the first application A. For example, when the second electronic device 400 requests second data 1M of the entire data 100M of the first application A, the server 200 may detect, as the second data 1M, the remaining data 1M except for first data 99M corresponding to 0M to 99M of the entire data 100M of the first application A, and may transmit the same to the second electronic device 400. The first electronic device 300 may send a request for the first application to the server 200, and may receive, from the server 200, the entire data of the first application or only the first data a1 which is partial data of the entire data thereof. As illustrated in FIG. 4A, the first electronic device 300 may be connected to the server 200 through the Internet, may download and store the entire data (a1+a2) of the first application A received from the server 200, and may separately store, in a sharing storage unit, the first data a1 of the entire data (a1+a2) of the first application A in order to share the first application A.

According to an embodiment of the present disclosure, when the first electronic device 300 uses the same platform as the server 200, the first electronic device 300 may download and store the entire data (a1+a2) of the first application A from the server 200, and may separately store, as data of a shared application of the first application A, the first data a1 of the entire data (a1+a2) thereof according to the configuration of a shared application. The first electronic device 300 may execute the first application A based on the entire data of the first application A, and may also use the first data a1 of the entire data thereof as data of a shared application of the first application A.

According to an embodiment of the present disclosure, as illustrated in FIG. 4B, the first electronic device 300 may be connected to the server 200 through the Internet, and may store, as data of a shared application of the first application A, only the first data a1 of the entire data (a1+a2) of the first application A received from the server 200.

According to an embodiment of the present disclosure, when the first electronic device 300 uses a platform different from that of the server 200, the first electronic device 300 may transmit, to the server 200, a connection request signal having changed header information such that the first electronic device 300 recognizes that the first electronic device 300 is using the same platform as the server 200, and may be connected to the server 200. The first electronic device 300 may download and store only the first data a1 of the entire data of the first application A from the server 200. The first electronic device 300 may use the first data a1 of the entire data of the first application A received from the server 200, as data of a shared application of the first application A for transmitting the first application A to the second electronic device 400.

According to an embodiment of the present disclosure, as illustrated in FIG. 4C, the first electronic device 300 may be connected to the second electronic device 400, and may be connected to the second electronic device 400 by using a peer to peer (P2P) connection scheme (e.g., USB, WiFi P2P, BT, etc.). The creation of a P2P group using WiFi P2P technology may allow not only one to one (1:1) connection but also one to N (1:N) connection, and thus, the first electronic device 300 may be connected to multiple second electronic devices 400.

According to an embodiment of the present disclosure, as illustrated in FIG. 4D, the first electronic device 300 may transmit, to the second electronic device 400, the first data a1 of the entire data of the first application A and basic information of the first application A (e.g., the name thereof and capacity information of the first data a1 thereof).

The second electronic device 400 may be connected to the first electronic device 300 to receive the first data a1 of the entire data (a1+a2) of the first application A from the first electronic device 300, and may be connected to the server 200 to perform business logic and then receive the second data a2 of the entire data (a1+a2) of the first application A from the server 200.

According to an embodiment of the present disclosure, as illustrated in FIG. 4C, the second electronic device 400 may be connected to the first electronic device 300, and may be connected to the first electronic device 300 by using a P2P connection scheme (e.g., USB, WiFi direct, BT, etc.).

According to an embodiment of the present disclosure, as illustrated in FIG. 4D, the second electronic device 400 may receive, from the first electronic device 300, the first data a1 of the entire data of the first application A and basic information of the first application A (e.g., name information thereof and capacity information of the first data a1 thereof).

According to an embodiment of the present disclosure, as illustrated in FIG. 4E, the second electronic device 400 may be connected to the server 200 and may request information of the first application A based on name information in basic information of the first application A received from the first electronic device 300. The second electronic device 400 may detect the capacity of the second data a2, which is the remaining data of the first application A, based on capacity information of the first data of the first application A in the basic information, which is received from the first electronic device 300, and based on capacity information of the entire data of the first application A included in use condition information received from the server 200, and may send a request for the second data a2 of the first application A to the server 200.

According to an embodiment of the present disclosure, the second electronic device 400 may generate the entire data of the first application A by combining the first data a1 of the entire data of the first application A, which is received from the first electronic device 300, with the second data a2 which is the remaining data of the entire data of the first application A received from the server 200.

Configurations of the first and second electronic devices 300 and 400 of FIGS. 4A to 4E are described below in greater detail with reference to FIG. 5A.

Figure 5A:
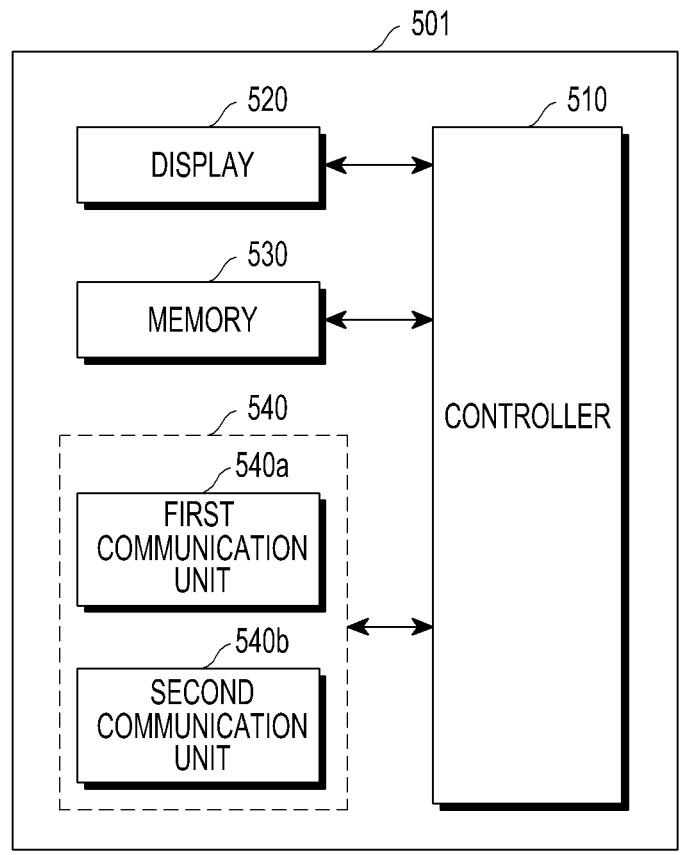
FIG. 5A is a block diagram of an electronic device according to an embodiment of the present disclosure.

FIG. 5A is a block diagram of an electronic device according to an embodiment of the present disclosure.

Referring to FIG. 5A, as illustrated in FIGS. 4A to 4E, the electronic device 501 may be the first electronic device 300 capable of transmitting first data, which is partial data of the entire data (a1+a2) of an application, to the second electronic device 400, and may be the second electronic device 400 capable of receiving the first data, which is partial data of the entire data thereof, from the first electronic device 300.

The electronic device 501 may include a controller 510, a display 520, a memory 530, and a communication unit 540.

The controller 510 may be the controller of the first electronic device 300 of FIG. 4.

When the first electronic device 501 uses the same platform as a server, the controller 510 may download and store the entire data of a first application from the server, separately store first data which is partial data of the entire data of the first application, and transmit the first data, which is partial data of the first application, to a second electronic device.

The controller 510 may be connected to the server through a first communication unit 540a (the RF module 229 of FIG. 2), and, when a first application is selected from among multiple applications provided by the server, may perform business logic (e.g., settlement, security, compatibility determination, etc.) with the server and then may be provided with the first application from the server.

When a download of the first application is selected among multiple applications provided by the server, if the first application is configured as a shared application, the controller 510 may store, in the memory 530, the entire data (a1+a2) of the first application received from the server, and may store first data a1, which is partial data of the entire data (a1+a2) of the first application, in a sharing storage unit of the memory 530. The first data a1 of the entire data (a1+a2) of the first application may include an installation file of the first application. The controller 510 may configure the first data a1 of the entire data (a1+a2) of the first application, and may configure the first data a1 as, for example, 90% of the entire data (a1+a2) of the first application. The configuration of the first data a1 of the entire data (a1+a2) of the first application may be performed by the server.

When the controller 510 downloads and stores the first application from the server, the controller 510 may display information for inquiring of a user about whether the first application is to be configured as a shared application. When the configuration of the first application as a shared application is selected, the controller 510 may store the entire data (a1+a2) of the first application in the memory 530, and may store the first data a1, which is partial data of the entire data (a1+a2) of the first application, in a sharing storage unit of the memory 530.

When the entire data of the first application is stored in the memory 530 and then the configuration of the first application as a shared application is selected, the controller 510 may store the first data a1, which is partial data of the entire data (a1+a2) of the first application, in a sharing storage unit of the memory 530.

FIGS. 6A, 6B, 6C, and 6D are illustrations of an operation of downloading an application by an electronic device according to an embodiment of the present disclosure.

Figure 6A:
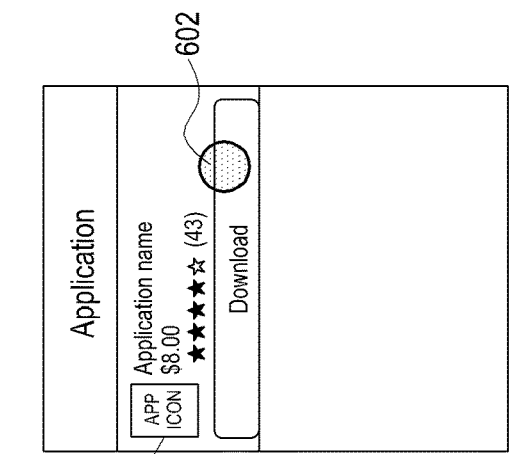
FIGS. 6A, 6B, 6C, and 6D are illustrations of an operation of downloading an application by an electronic device according to an embodiment of the present disclosure.
Figure 6B:
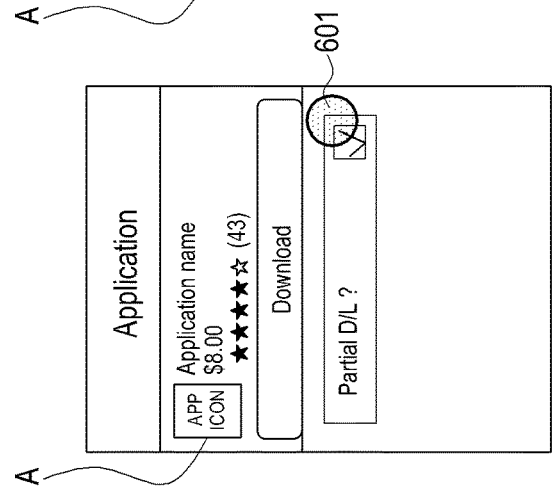

Referring to FIGS. 6A, 6B, 6C, and 6D, when a user selects a particular application market (e.g., Tizen®) in the first electronic device 501 as illustrated in FIGS. 6A and 6B, the types of applications provided by the particular application market may be displayed.

Figure 6C:
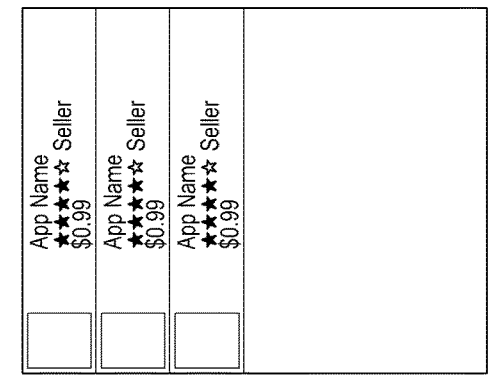

When the user selects a first application A from among the types of applications, as illustrated in FIG. 6C, a screen, which enables a user to download a first application A and configure the first application A as a shared application, may be displayed.

Figure 6D:
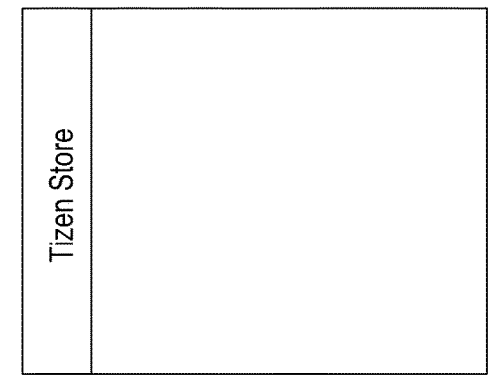

When the first application A is configured (as indicated by reference numeral 601) as a shared application as illustrated in FIG. 6C and then the download of the first application A is selected (as indicated by reference numeral 602) as illustrated in FIG. 6D, the first application A may be stored in the memory 530, and the first data a1, which is partial data of the entire data of the first application A, may be stored in a separate sharing storage unit of the memory 530.

According to an embodiment of the present disclosure, when the first electronic device 501 uses a platform different from that of a server, the controller 510 may transmit, to the server, a connection request signal having changed header information such that the first electronic device 501 recognizes that the first electronic device 501 is using the same platform as the server, may download only the first data, which is partial data of the first application, from the server, and may store the first data as a shared application of the first application.

According to an embodiment of the present disclosure, the controller 510 may be connected to the server through the first communication unit 540a according to the connection request signal having the changed header information, and when the first application is selected from among multiple applications provided by the server, may perform business logic (e.g., settlement, security, compatibility determination, etc.) with the server and then may be provided with the first application from the server.

According to an embodiment of the present disclosure, when the download of the first data a1, which is partial data of the entire data (a1+a2) of the first application, is selected among multiple applications provided by the server, the controller 510 may receive only the first data a1 of the entire data (a1+a2) of the first application A from the server, and may store the first data a1 of the first application A in a sharing storage unit of the memory 530, as a shared application of the first application A.

Figure 5B:
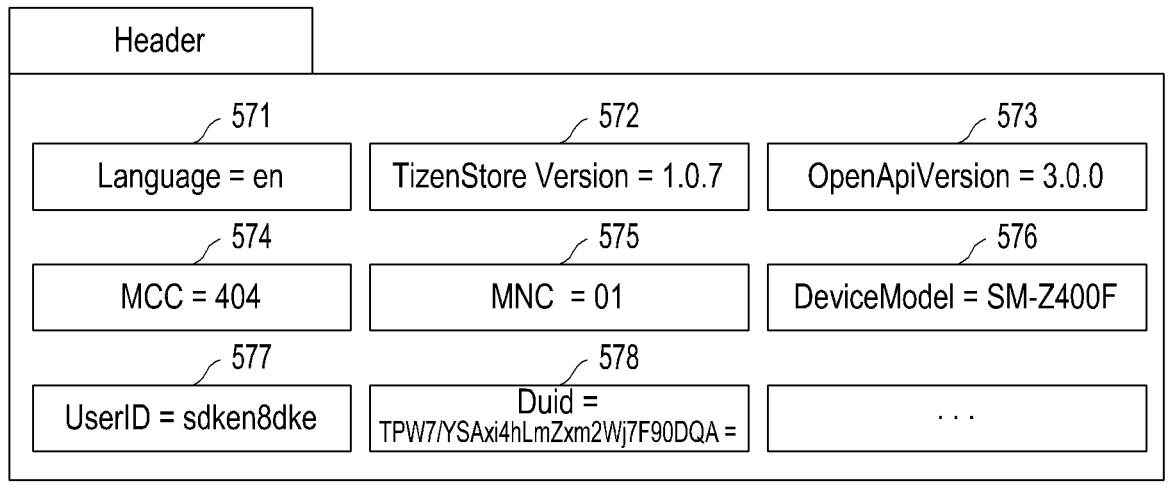
FIG. 5B is an illustration of header information of a connection request signal for connecting an electronic device to a server using a different platform 30 in the electronic device according to an embodiment of the present disclosure.

According to an embodiment of the present disclosure, when a server uses a first platform (e.g., Tizen®) and a first electronic device uses a second platform (e.g., Android®) different from the first platform, the controller 510 may transmit, to the server, a connection request signal having changed header information such that the first electronic device recognizes that the first electronic device is using the same first platform as the server. FIG. 5B is an illustration of header information of a connection request signal for connecting an electronic device to a server using a different platform in the electronic device. FIG. 5B illustrates a header part of the connection request signal transmitted by a second electronic device using the second platform so as to be connected to the server using the first platform.

Referring to FIG. 5B, the first electronic device using the second platform may change information on at least one item among multiple items included in a header of the connection request signal, so as to allow the first electronic device itself to recognize that the first electronic device is using the same first platform as the server.

A language (e.g., "Language=en") supported by a first platform may be input to a first item 571 to which language information supported by a platform is input among multiple items of the header.

Program version information (e.g., "TizenStore Version=1.0.7") of an application store supporting a first platform (e.g., Tizen®) may be input to a second item 572 to which version information of an application store supporting a platform is input among multiple items of the header.

Version information (e.g., "OpenApiversion=T3.0.0") of a first platform (e.g., Tizen®) may be input to a third item 573 to which version information of a platform is input among multiple items of the header.

A country code (e.g., "MCC=404") supporting a first platform (e.g., Tizen®) may be input to a fourth item 574 to which a country code supporting a platform is input among multiple items of the header.

A communication company code (e.g., "MNC=01") supporting a first platform (e.g., Tizen®) may be input to a fifth item 575 to which a communication company code supporting a platform is input among multiple items of the header.

The model name (e.g., "DeviceModel=SM-Z400F") of a terminal supporting a first platform (e.g., Tizen®) may be input to a sixth item 576 to which the model name of a terminal supporting a platform is input among multiple items of the header.

An identifier (ID) (e.g., "UserID=sdken8dke") capable of logging in to a first platform (e.g., Tizen®) account may be input to a seventh item 577 to which an ID of a platform account is input among multiple items of the header.

A unique ID (e.g., "Duid=YPW7/YSAxi4hLmZxm2Wj7F9DQA") of a terminal supporting a first platform (e.g., Tizen®) may be input to an eighth item 578 to which an ID of a sharing apparatus of a terminal supporting a platform is input among multiple items of the header.

The controller 510 may be connected to the second electronic device 400 and may transmit at least one shared application stored in the sharing storage unit of the memory.

When the controller 510 is connected to a second electronic device 400 by using the second communication unit 540b (the WiFi module 223, BT module 225, and NFC module 228 of FIG. 2), the controller 510 may transmit, to the second electronic device, a shared application list including at least one shared application selected by a user among at least one shared application stored in the sharing storage unit of the memory 530. The controller 510 may be connected to the second electronic device by using a P2P connection scheme (e.g., USB, WiFi direct, BT, etc.) capable of transmitting a file between electronic devices.

When the controller 510 sends a connection request to a second electronic device and is connected to the second electronic device, the controller 510 may transmit a shared application list to the second electronic device.

The controller 510 may be connected to a second electronic device at a connection request of the second electronic device, and may transmit a shared application list to the second electronic device at a connection request of the second electronic device.

Figures 7A, 7B, 8A, 8B:
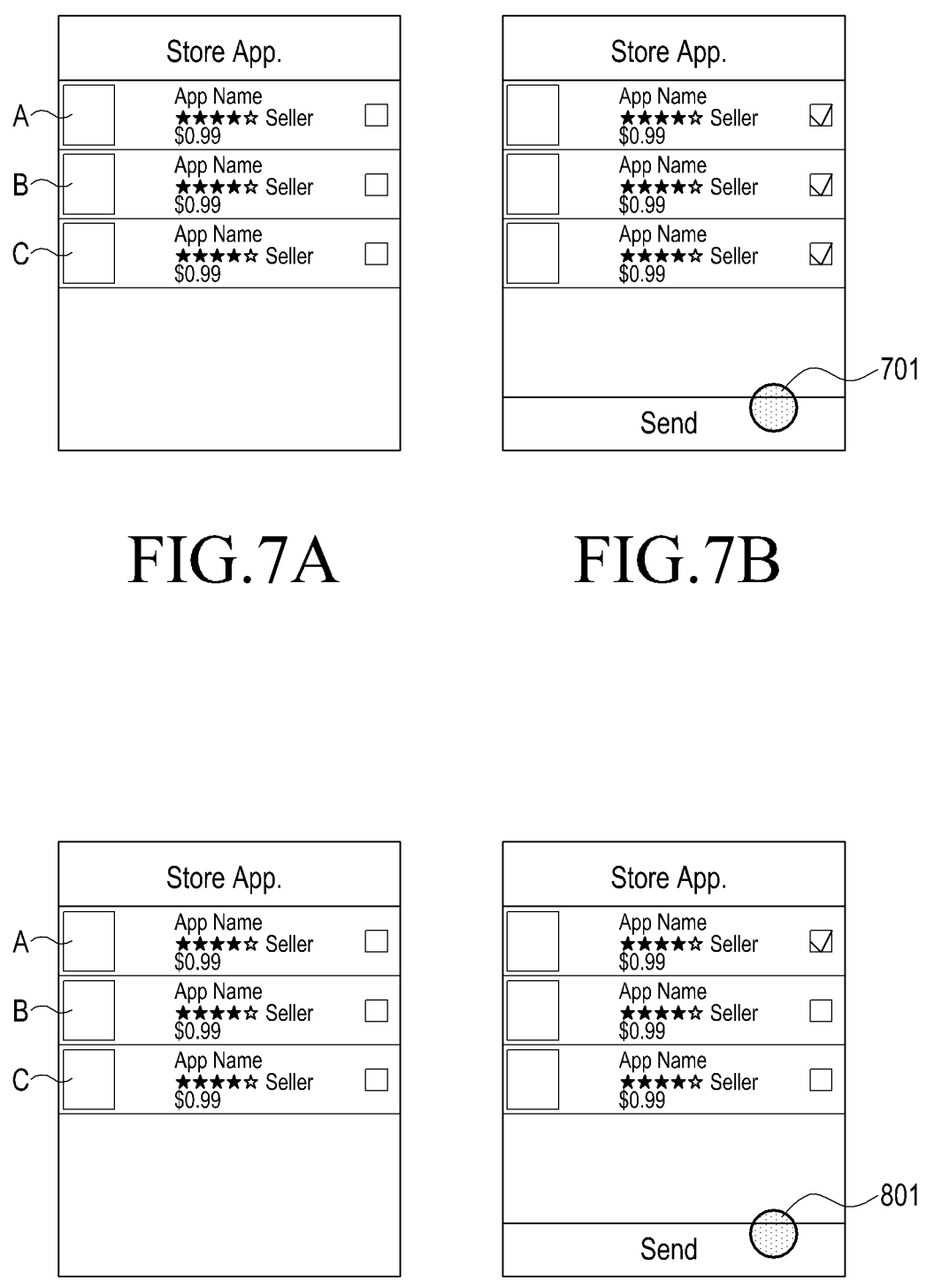

FIGS. 7A and 7B are illustrations of an operation of transmitting a shared application by an electronic device according to an embodiment of the present disclosure.

Referring to FIGS. 7A and 7B, in a state of being connected to a second electronic device, multiple shared applications A, B, and C separately stored in the sharing storage unit of the memory may be displayed. When all of the shared applications A, B, and C are selected from among the multiple shared applications A, B, and C and then a send button is touched (as indicated by reference numeral 701), a shared application list including all of the shared applications A, B, and C may be transmitted to the second electronic device.

When a user of the second electronic device requests a first application in the shared application list, the controller 510 may send a request for final update information of the first application to a server. The controller 510 may update the first application based on the final update information of the first application received from the server, and may update first data of the first application.

When the entire data (a1+a2) and first data a1 of the entire data (a1+a2) are stored as data of the first application A requested by the second electronic device, the controller 510 may send a request for installation information of the second electronic device to the second electronic device in order to check whether the second electronic device uses the same platform as the first electronic device 501, and may determine whether the second electronic device satisfies an executable condition for the first application, based on the installation information of the second electronic device. When the installation information of the second electronic device does not satisfy the executable condition for the first application, the controller 510 may transmit, to the second electronic device, notification of a transmission failure, and may release the connection with the second electronic device. When the installation information of the second electronic device satisfies the executable condition for the first application, the controller 510 may transmit, to the second electronic device, the first data a1 of the entire data of the first application and basic information of the first application (e.g., name information thereof and capacity information of the first data a1 thereof). The installation information may include at least one piece of information among version information of an electronic device and compatibility information (e.g., API(OS) and resolution) thereof.

When only the first data a1 of the entire data is stored as data of the first application A requested by the second electronic device, without checking whether the same platform is used, the controller 510 may transmit, to the second electronic device, the first data a1 of the entire data of the first application and basic information of the first application (e.g., name information thereof and capacity information of the first data a1 thereof).

The controller 510 may be the controller of the second electronic device 400 of FIG. 4.

According to an embodiment of the present disclosure, first data which is partial data of the entire data of an application may be received from a first electronic device, may perform business logic with a server, and then may receive, from the server, second data which is the remaining data of the entire data of the application.

When the controller 510 is connected to a first electronic device by using the second communication unit 540b (the WiFi module 223, BT module 225, and NFC module 228 of FIG. 2), the controller 510 may receive a shared application list from the first electronic device. The controller 510 may be connected to the first electronic device by using a P2P connection scheme (e.g., USB, WiFi direct, BT, etc.) capable of transmitting a file between electronic devices.

When the controller 510 sends a connection request to a first electronic device and is connected to the first electronic device, the controller 510 may send a request for a shared application list to the first electronic device.

The controller 510 may be connected to a first electronic device at a connection request of the first electronic device, and may receive a shared application list from the first electronic device.

The controller 510 may send, to the first electronic device, a request for a first application selected by a user from the shared application list received from the first electronic device.

FIGS. 8A and 8B are illustrations of an operation of receiving a shared application by an electronic device according to an embodiment of the present disclosure.

Referring to FIGS. 8A and 8B, in a state of being connected to a first electronic device, a shared application list including multiple shared applications A, B, and C received from the first electronic device may be displayed. When a user selects a first application A from among the multiple shared applications A, B, and C and then touches a send button (as indicated by reference numeral 801), a request for the first application A may be sent to the first electronic device.

When the first electronic device requests installation information of an electronic device, the controller 510 may transmit the installation information of an electronic device to the first electronic device. The installation information may include at least one piece of information among version information of an electronic device and compatibility information (e.g., API (OS) and resolution) thereof.

The controller 510 may receive, from the first electronic device, first data a1 of the entire data of the first application and basic information of the first application (e.g., name information thereof and capacity information of the first data a1 thereof). The controller 510 may be connected to a server by using the first communication unit 540a, and may send, to the server, a request for downloading second data which is the remaining data of the entire data of the first application, based on the basic information of the first application received from the first electronic device and use condition information received from the server.

The controller 510 may receive, from a server, use condition information for the first application, and, when a user of an electronic device does not agree to the use condition information, may delete the first data a1 of the first application received from the first electronic device.

When the user of the electronic device agrees to the use condition information for the first application received from the server, the controller 510 may perform business logic with the server based on the agreement to the use condition information. After the controller 510 performs the business logic with the server, the controller 510 may send, to the server, a request for second data a2 which is the remaining data of the entire data of the first application, based on the entire capacity information of the first application among pieces of application information included in the use condition information and based on capacity information of the first data of the first application included in the basic information of the first application received from the first electronic device. The use condition information may include at least one piece of information among a user's right, paid information, permission information, and application information.

The controller 510 may detect second data a2 which is the remaining data of the entire data (a1+a2) of the first application based on the application information (e.g., capacity information of the entire data of the first application) included in the use condition information, and may send, to the server, a request for the second data a2 of the entire data (a1+a2) of the first application. When a ratio of a size of first data a1 to a size M of entire data of the first application is d%, a size of the second data a2 which is the remaining data of the entire data of the first application is (M×(100−d)). The controller 510 may access the server, and may send, to the server, a request for the second data a2 of the first application.

The controller 510 may detect capacity information 1M of the second data a2 which is the remaining data of the first application, based on capacity information 99M of the first data a1 of the first application received from the first electronic device and based on capacity information 100M of the entire data of the first application included in the use condition information received from the server, and may send, to the server, a request for the capacity information 1M of the second data a2 which is the remaining data of the first application.

When the second data a2 of the first application is received from the server, the controller 510 may generate and store the entire data of the first application by combining the first data a1 of the first application received from the first electronic device with the second data a2 of the first application received from the server. When the controller 510 receives the second data a2 of the first application from the server, the controller 510 may receive DRM information.

When the first application is configured as a shared application while the second data a2 of the first application is received from the server, the controller 510 may separately store the first data a1 of the first application in the sharing storage unit of the memory 530, and may generate and store the entire data of the first application by combining the first data a1 of the first application with the second data a2 of the first application.

After the controller 510 transmits installation information of an electronic device to the first electronic device at a request of the first electronic device, when the installation information of an electronic device does not satisfy a condition for executing the first application, the controller 510 may receive, from the first electronic device, notification of a transmission failure, and may release the connection with the first electronic device.

The controller 510 may receive, from the first electronic device, the notification of a transmission failure, and when the controller 510 releases the connection with the first electronic device, may access the server and may send, to the server, a request for information of an electronic device having downloaded the entire data of the first application. The controller 510 may search for neighboring electronic devices by performing a scan operation through the second communication unit 540b. When an electronic device corresponding to information of an electronic device received from the server is found among the electronic devices obtained by a result of the search, the controller 510 may send a connection request to the electronic device, which corresponds to the information of an electronic device received from the server, and may send a request for a shared application list to the corresponding electronic device.

When the controller 510 receives, from the first electronic device, notification of a transmission failure and releases the connection with the first electronic device, the controller 510 may search for at least one neighboring electronic device through a scan operation using the second communication unit 540b. The controller 510 may detect notification of an existence of a shared application, from a beacon signal received from the at least one electronic device found through a scan operation. While the controller 510 displays a type of the found at least one electronic device on the display 520, the controller 510 may display an icon that notifies of the existence of a shared application on at least one electronic device that transmitted the beacon signal including the notification of the existence of a shared application. The controller 510 may be connected to an electronic device selected by a user among the at least one electronic device that displays the icon that notifies of the existence of the shared application, and may send a request for a shared application list to the selected electronic device.

In order to download a first application, the controller 510 is first connected to a server and sends a request for the first application to the server, and the controller 510 may receive, from the server, information of a first electronic device that downloaded the entire data of the first application. The controller 510 may search for neighboring electronic devices by performing a scan operation by using the second communication unit 540b. When an electronic device corresponding to the information of the first electronic device received from the server is detected among the electronic devices found through the scan operation, the controller 510 may send a connection request to the first electronic device, and may send a request for a shared application list to the first electronic device.

In order to download the first application, the controller 510 may first search for at least one neighboring electronic device through a scan operation using the second communication unit 540b. The controller 510 may detect a notification of an existence of a shared application, from a beacon signal received from the at least one electronic device found through a scan operation. While the controller 510 displays the type of the found at least one electronic device on the display 520, the controller 510 may display an icon that notifies of the existence of a shared application, on the at least one electronic device having transmitted the beacon signal including the notification of the existence of a shared application. The controller 510 may be connected to an electronic device selected by a user among the at least one electronic device that displays the icon that notifies of the existence of the shared application, and may send a request for a shared application list to the selected electronic device.

The display 520 may display a shared application list.

The display 520 may display a notification of a transmission failure of an application.

The memory 530 may include a separate sharing storage unit that stores first data which is partial data of an application configured as a shared application.

The communication unit 540 may include a first communication unit 540a and a second communication unit 540b, and may be, for example, the communication module 220 illustrated in FIG. 2.

According to an embodiment of the present disclosure, an electronic device may include a display; and a controller that is electrically connected to the display, wherein the controller may be configured to receive first data which is partial data of entire data of an application from a first electronic device; and when a user agrees to use condition information of an application received from a second electronic device, receive second data which is remaining data of the entire data of the application from the second electronic device, and generate the entire data of the application.

According to an embodiment of the present disclosure, the controller may be configured to make a connection to the first electronic device; and when a shared application list is received from the first electronic device, send, to the first electronic device, a request for an application selected in the shared application list.

According to an embodiment of the present disclosure, the controller may be configured to transmit installation information of the electronic device to the first electronic device at a request of the first electronic device; and when the electronic device satisfies an executable condition for the application based on the installation information of the electronic device, receive the first data of the application from the first electronic device.

According to an embodiment of the present disclosure, the controller may be configured to, when the electronic device does not satisfy the executable condition for the application based on the installation information of the electronic device, display a notification of a transmission failure of the application and release the connection to the first electronic device.

According to an embodiment of the present disclosure, the controller may be configured to when the first data of the application is received from the first electronic device, send a request for information of the application to the second electronic device; receive use condition information of the application from the second electronic device at the request for the information of the application; and when a user of the electronic device agrees to the use condition information of the application, send, to the second electronic device, a request for the second data of the application based on information of an application included in the use condition information of the application.

According to an embodiment of the present disclosure, the controller may be configured to, when a user of the electronic device does not agree to the use condition information of the application, delete the first data of the application which has been received from the first electronic device and is stored.

According to an embodiment of the present disclosure, the use condition information of the application may include at least one piece of information among a user's right, paid information, permission information, and application information.

According to an embodiment of the present disclosure, the controller may be configured to send a request for downloading the application to the second electronic device to; and, when the application is configured as a shared application while the application is received and downloaded from the second electronic device, separately store the first data of the entire data of the application.

According to an embodiment of the present disclosure, the controller may be configured to when the entire data of the first application and the first data of the entire data of the first application are stored in the electronic device, transmit a shared application list to the first electronic device; when the first electronic device requests reception of the application, request installation information of the first electronic device; and when the installation information of the first electronic device received from the first electronic device satisfies an executable condition for the application, transmit the first data of the first application to the first electronic device.

According to an embodiment of the present disclosure, the controller may be configured to, when the electronic device stores the first data of entire data of a first application without storing the entire data of the first application, transmit the first data of the first application to the first electronic device.

Figure 9A:
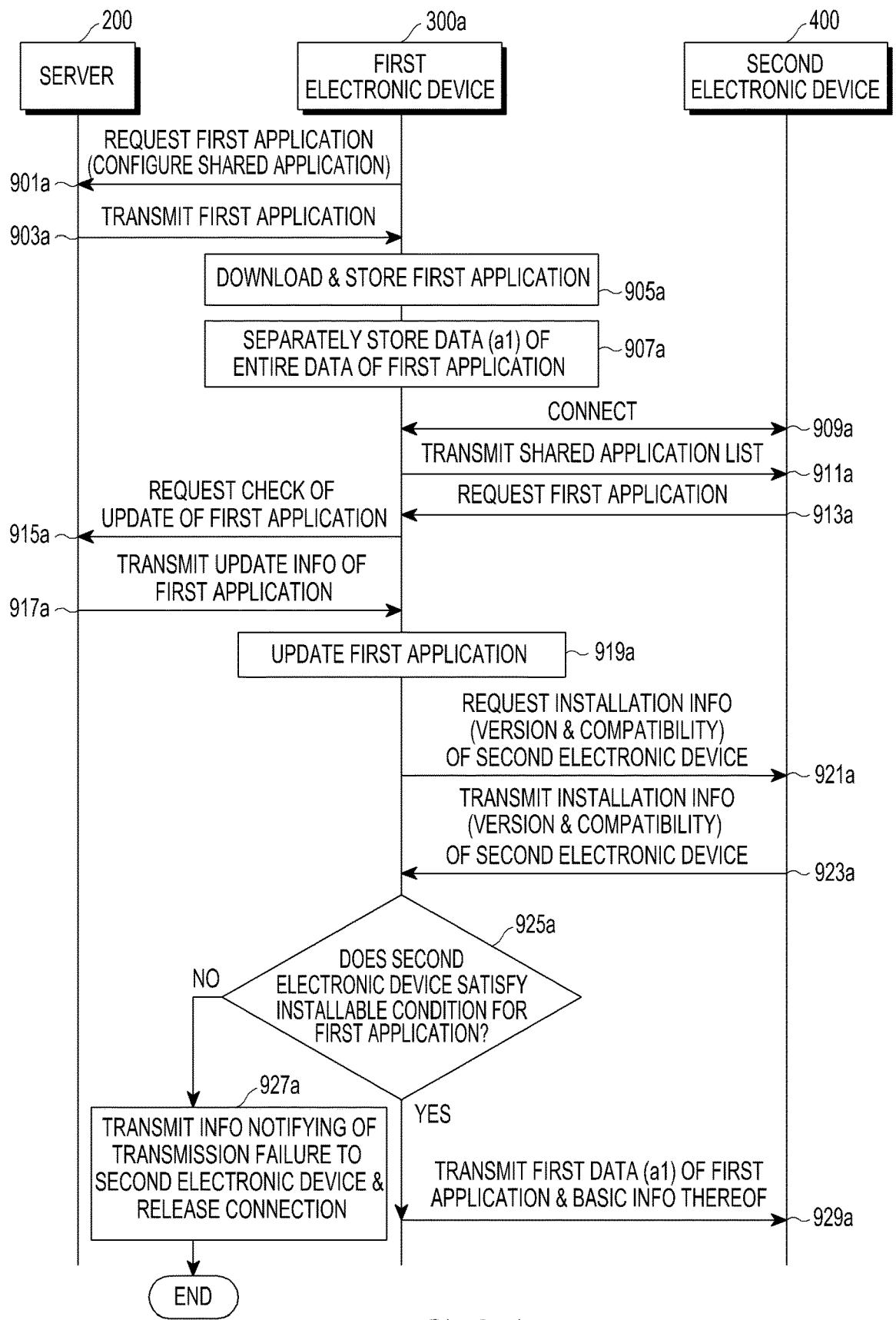
FIGS. 9A, 9B, and 9C are signal flow diagrams each illustrating an operation of sharing an application in an application sharing system according to an embodiment of the present disclosure.
Figure 9B:
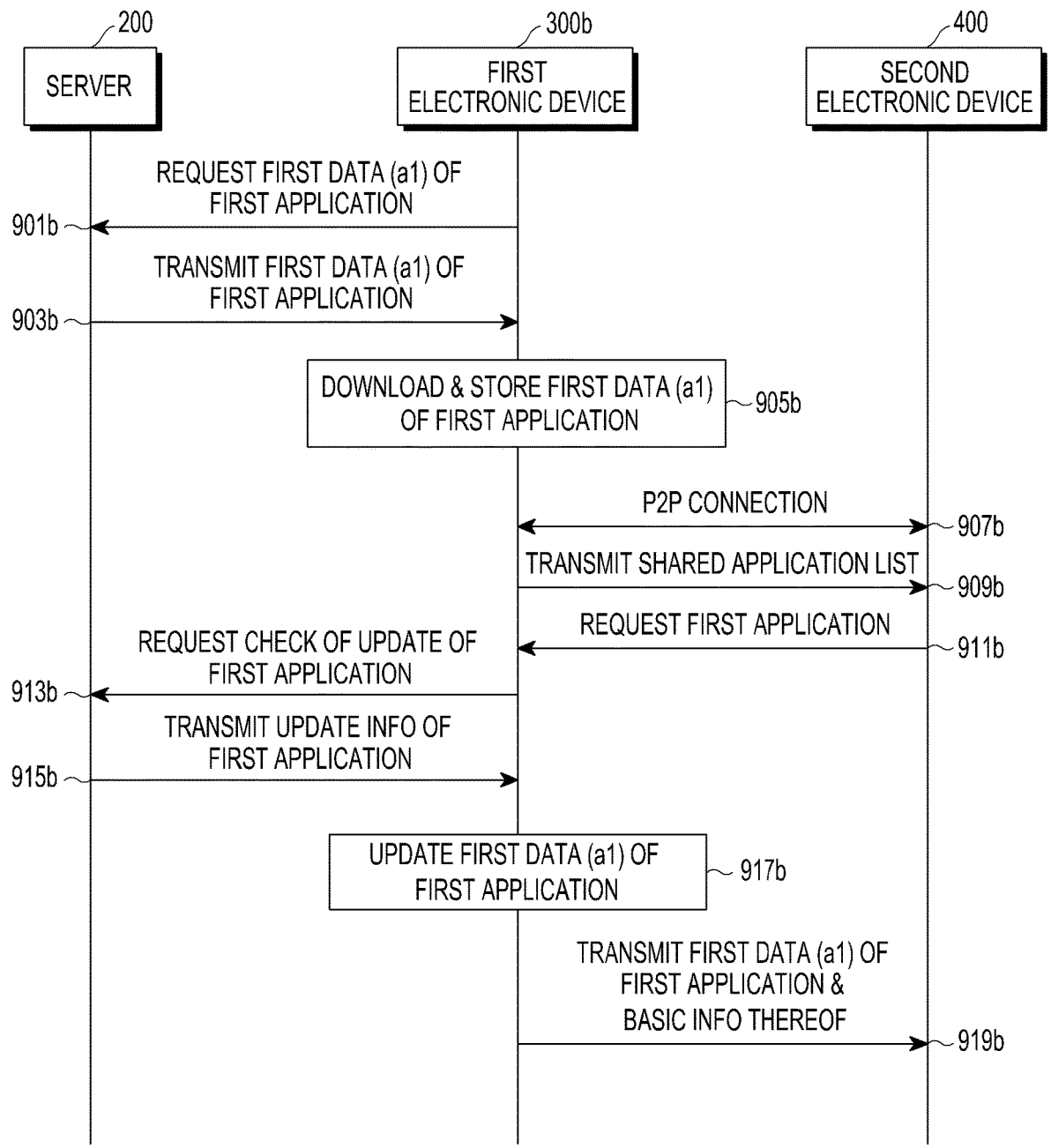
Figure 9C:
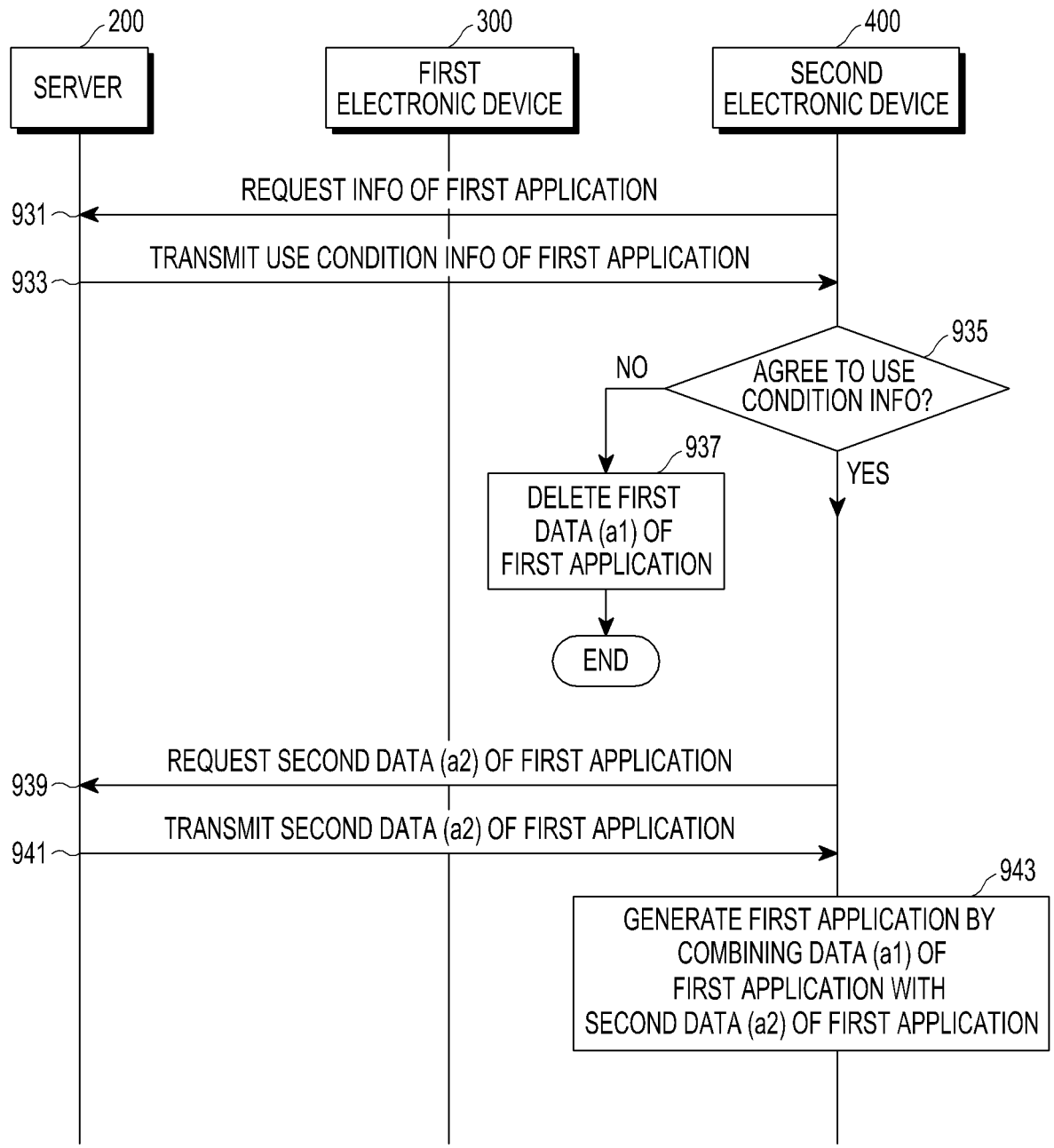

FIGS. 9A to 9C are signal flow diagrams each illustrating an operation of sharing an application in an application sharing system according to an embodiment of the present disclosure.

Referring to FIG. 9A, the server 200, a first electronic device 300a, and a second electronic device 400 use the same platform.

In step 901a, the first electronic device 300a may be connected to the server 200 through the Internet, and then may send, to the server 200, a request for downloading a first application among multiple applications provided by the server 200 and for information for configuring the first application as a shared application. In step 903a, the server 200 may perform business logic (DRM information, storage of a download record within the server, paid settlement processing, etc.) with the first electronic device 300a, and may transmit the first application to the first electronic device 300a.

In step 905a, the first electronic device 300a may download the entire data of the first application received from the server 200 and may store the entire data of the first application in a memory.

In step 907a, according to the configuration of the first application as a shared application, the first electronic device 300a may store first data a1, which is partial data of the entire data (a1+a2) of the first application, in a sharing storage unit of the memory. The first data a1 of the first application may include an installation file.

In step 909a, the first electronic device 300a may be connected to the second electronic device 400 by using a P2P connection scheme.

In step 911a, the first electronic device 300a may transmit, to the second electronic device 400, a shared application list including at least one shared application selected by a user among at least one shared application stored in the sharing storage unit of the memory of the first electronic device 300a.

In step 913a, the second electronic device 400 may display the shared application list received from the first electronic device 300a, and, when a user selects a first application in the shared application list, may send a request for the first application to the first electronic device 300a.

In step 915a, when the second electronic device 400 sends a request for the first application to the first electronic device 300a, the first electronic device 300a may request the server 200 to check final update information of the first application.

In step 917a, the first electronic device 300a may receive, from the server 200, final update information of the first application.

In step 919a, the first electronic device 300a may determine whether the first application is to be updated, based on the final update information of the first application, and, when the first application must be updated, may update each of the first application and the first data a1 of the first application.

In step 921a, in order to check whether the second electronic device 400 uses the same platform, the first electronic device 300a may send a request for installation information of the second electronic device 400 to the second electronic device 400.

In step 923a, the second electronic device 400 may transmit, to the first electronic device 300a, at least one piece of information among version information and compatibility information (e.g., API (OS) and resolution) of an electronic device, as the installation information of the second electronic device 400.

In step 925a, the first electronic device 300a may determine whether the second electronic device 400 satisfies an installable condition for the first application, based on the installation information of the second electronic device 400 received from the second electronic device 400.

When it is determined in step 925a that the second electronic device 400 does not satisfy the installable condition for the first application, in in 927a, the first electronic device 300a may transmit, to the second electronic device 400, a notification of a transmission failure of an application, and may release the connection with the second electronic device 400.

When it is determined in step 925a that the second electronic device 400 satisfies the installable condition for the first application, in step 929a, the first electronic device 300a may transmit, to the second electronic device 400, the first data a1 of the first application and basic information of the first application (e.g., name information thereof and capacity information of the first data a1 thereof).

Referring to FIG. 9B, a server 200 and a second electronic device 400 use the same first platform, and a first electronic device 300b uses a second platform different from the first platform.

In step 901b, the first electronic device 300b may transmit, to the server 200, a connection request signal having changed header information so as to allow the first electronic device 300b to determine if the first electronic device 300b uses the same platform as the server 200. In step 901b, the first electronic device 300b transmits the connection request signal having the changed header information, and then may be connected to the server 200 through the Internet.

In step 901b, the first electronic device 300b may select a first application from among multiple applications provided by the server 200, and may send, to the server 200, a request for downloading only first data a1 which is partial data of entire data of a selected first application.

In step 903b, the server 200 may perform business logic (DRM information, storage of a download record within the server, paid settlement processing, etc.) with the first electronic device 300b, and may transmit, to the first electronic device 300b, first data a1 of the entire data (a1+a2) of the first application.

In step 905b, the first electronic device 300b may download the first data a1 of the first application and store the same in a memory in order to use, as data of a shared application, the first data a1 of the entire data of the first application received from the server 200. The first data a1 of the first application may include an installation file.

In step 907b, the first electronic device 300b may be connected to the second electronic device 400 by using a P2P connection scheme.

In step 909b, the first electronic device 300b may transmit, to the second electronic device 400, a shared application list including at least one shared application selected by a user among at least one shared application stored in a sharing storage unit of the memory of the first electronic device 300b.

In step 911b, the second electronic device 400 may display the shared application list received from the first electronic device 300b, and, when a user selects a first application in the shared application list, may send a request for the first application to the first electronic device 300b.

In step 913b, when the second electronic device 400 send a request for the first application to the first electronic device 300b, the first electronic device 300b may request the server 200 to check final update information of the first application.

In step 915b, the first electronic device 300b may receive final update information of the first application from the server 200.

In step 917b, the first electronic device 300b may determine whether the first application is to be updated, based on the final update information of the first application, and, when the first application must be updated, may update the first data a1 of the first application.

In step 919b, the first electronic device 300b may transmit, to the second electronic device 400, the first data a1 of the first application and basic information of the first application (e.g., name information thereof and capacity information of the first data a1 of the first application).

FIG. 9C is an illustration of an operation of sending, to the server 200, a request for second data which is the remaining data of the entire data of the first application by the second electronic device 400 that received the first data which is partial data of the entire data of the first application from the first electronic device 300 as illustrated in FIGS. 9A and 9B.

Referring to FIG. 9C, in step 931, the second electronic device 400 may send a request for information of the first application to the server 200.

In step 933, the server 200 may transmit use condition information of the first application to the second electronic device 400. The use condition information may include at least one piece of information among a user's right, paid information, permission information, and application information.

In step 935, the second electronic device 400 may display use condition information of the first application received from the server 200, and when the second electronic device 400 does not receive a user's agreement to the use condition information of the first application, in step 937, may delete the first data a1 of the first application received from the first electronic device 300a or 300b.

In step 935, when the user of the second electronic device 400 agrees to the use condition information of the first application, the second electronic device 400 may perform business logic (storage of a download record within the server, paid settlement processing, etc.) with the server 200 based on the user's agreement to the use condition information of the first application.

In step 939, the second electronic device 400 may send, to the server 200, a request for second data a2, which is the remaining data of the first application, based on information of the first application included in the use condition information of the first application. The second electronic device 400 may detect the capacity of second data a2, which is the remaining data of the entire data (a1+a2) of the first application, based on capacity information of the first data a1 of the first application included in basic information of the first application received from the first electronic device 300a or 300b and based on capacity information of the entire data of the first application among pieces of information of the first application included in the use condition information received from the server 200.

In step 941, the server 200 may detect the capacity of the second data which is the remaining data except for the capacity of the first data in the entire data of the first application based on the capacity information of the second data a2 of the first application received from the second electronic device 400, and may transmit the detected capacity to the second electronic device 400.

In step 943, the second electronic device 400 may generate and store the entire data (a1+a2) of the first application by combining the first data a1 of the first application received from the first electronic device 300a or 300b with the second data a2 of the first application received from the server 200.

Figure 10A:
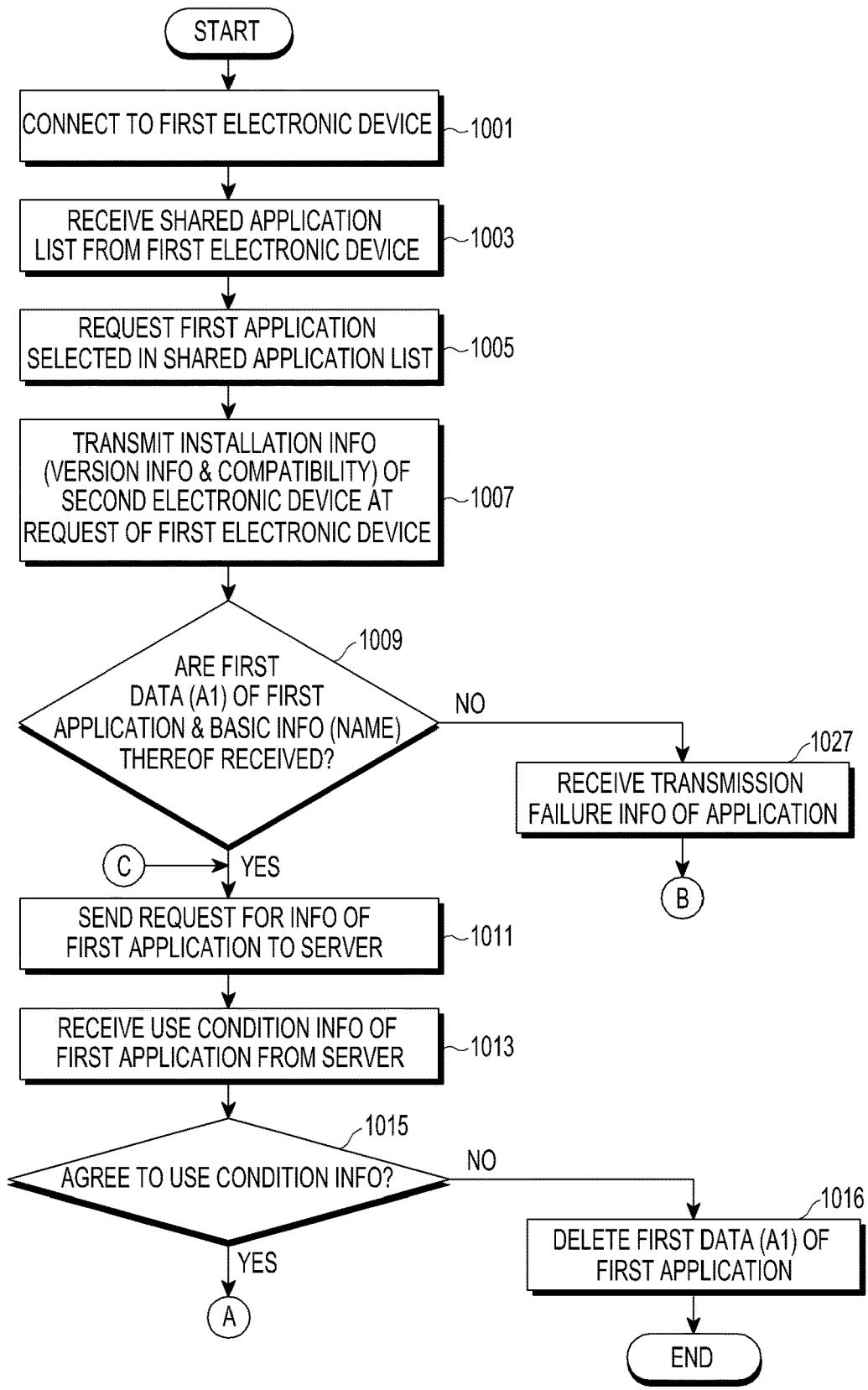
FIGS. 10A, 10B, and 10C are a flowcharts of a method of downloading an application by an electronic device according to an embodiment of the present disclosure.
Figure 10B:
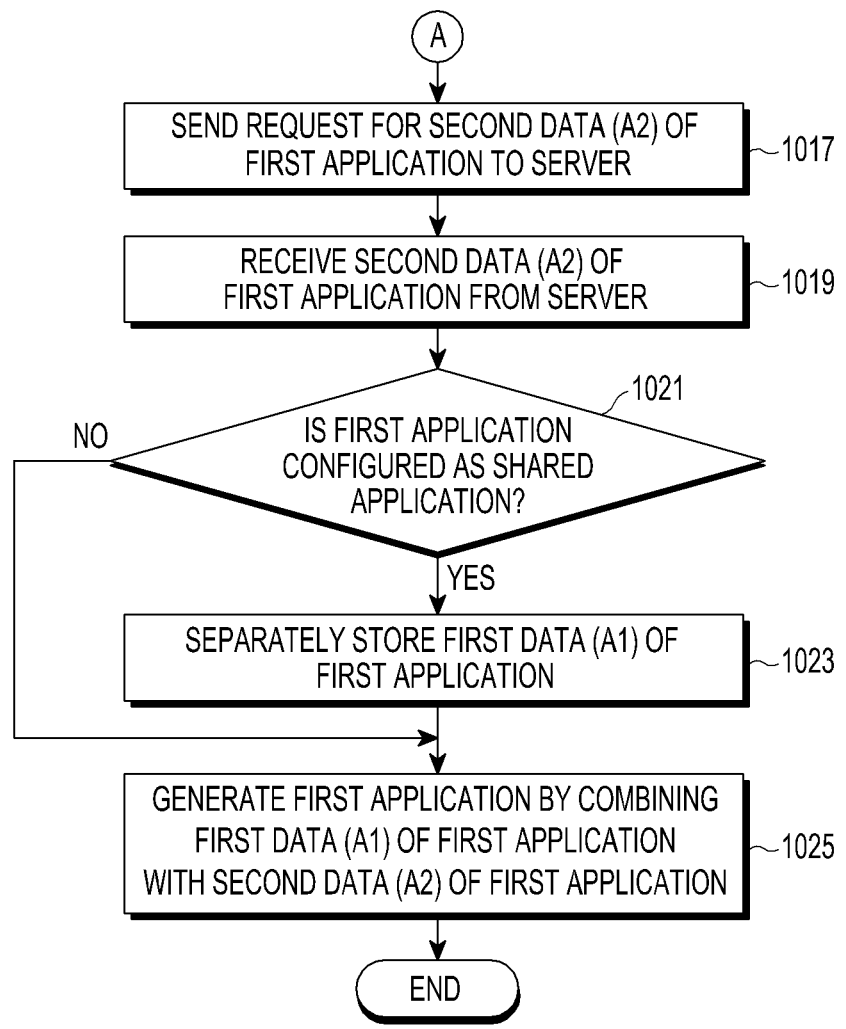
Figure 10C:
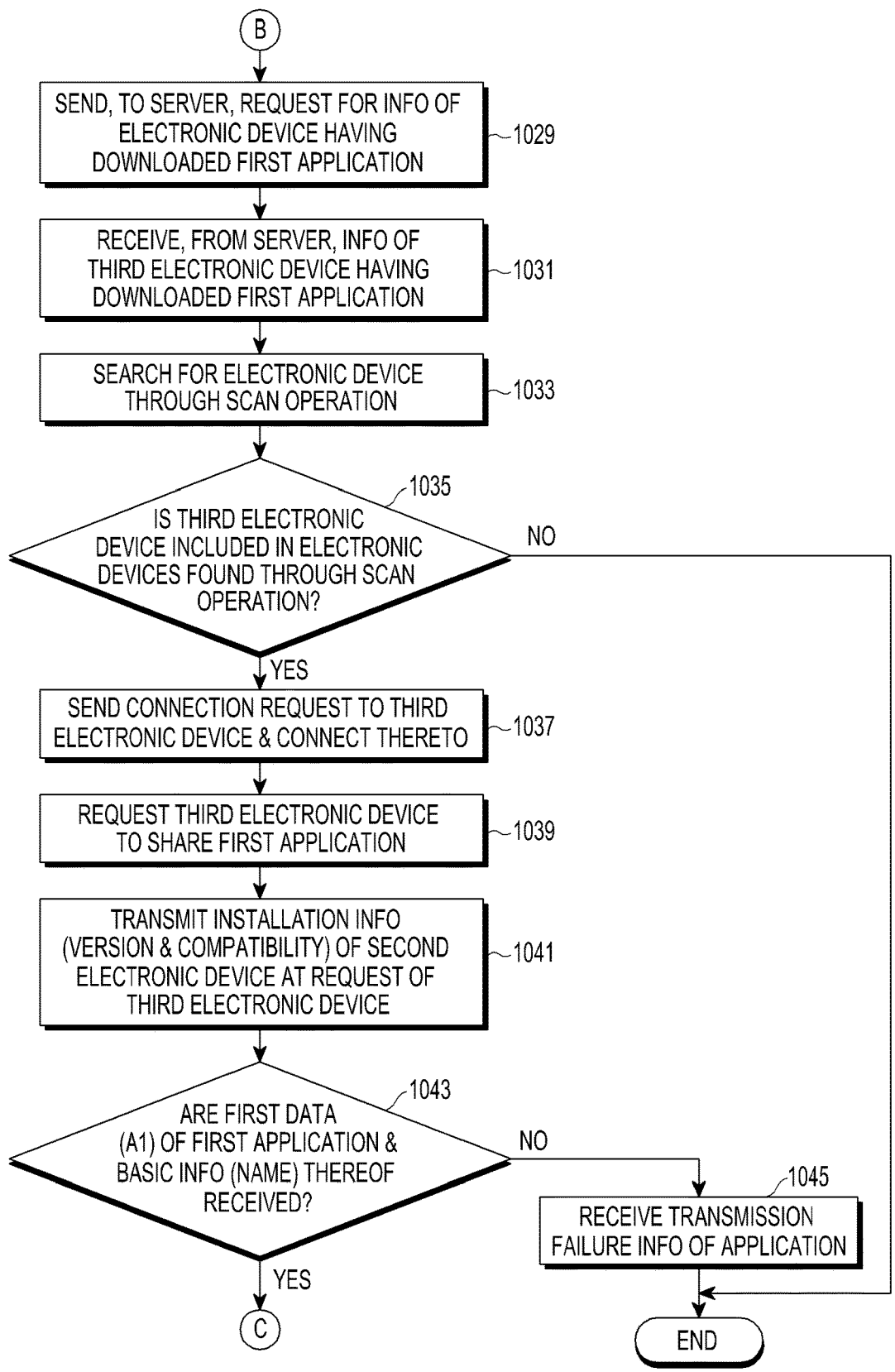

FIGS. 10A to 10C are a flowchart of a method of downloading an application by an electronic device according to an embodiment of the present disclosure. FIGS. 10A to 10C are illustrations of operations of the second electronic device 400 in FIGS. 9A to 9C.

Referring to FIG. 10A, in step 1001, the controller of the electronic device may be connected to a first electronic device. The controller may be connected to the first electronic device by using, for example, a P2P connection scheme.

In step 1003, the controller may receive a shared application list from the first electronic device.

In step 1005, the controller may send, to the first electronic device, a request for a first application selected in the shared application list. The controller may display, on a display, the shared application list received from the first electronic device, and may transmit, to the first electronic device, a first application selected by a user.

In step 1007, the controller may transmit installation information of a second electronic device to the first electronic device at a request of the first electronic device. When the first electronic device requests installation information of an electronic device in order to check whether the electronic device satisfies an executable condition for the first application, the controller may transmit, to the first electronic device, at least one piece of information among version information and compatibility information (e.g., API (OS) version and resolution) of the electronic device, as the installation information of the electronic device.

In step 1009, according to whether the electronic device satisfies the executable condition for the first application, the controller may determine whether first data of the first application and basic information of the first application (e.g., the name thereof) are to be received from the first electronic device.

In step 1009, according to a result of the determination that the electronic device satisfies (use of the same platform) the executable condition for the first application, when first data of the entire data of the first application and basic information of the first application (e.g., the name thereof) are received from the first electronic device, in step 1011, the controller may send a request for information of the first application to the server. The controller may send, to the server, a request for information of the first application together with the basic information of the first application received from the first electronic device.

In step 1013, the controller may receive use condition information of the first application from the server. The use condition information may include at least one piece of information among a user's right, paid information, permission information, and application information.

When a user's agreement to the use condition information of the first application received from the server is not received in step 1015, in step 1016, the controller may delete the first data a1 of the entire data of the first application.

In step 1015, when the user's agreement to the use condition information of the first application received from the server is received, the controller may perform business logic with the server based on the user's agreement to the use condition information.

Referring to FIG. 10B, in step 1017, the controller may send, to the server, a request for second data a2 which is the remaining data of the entire data of the first application. The controller may send a request for the second data a2 of the entire data (a1+a2) of the first application to the server based on application information included in the use condition information.

In step 1019, the controller may receive the second data a2 of the entire data of the first application from the server.

In step 1021, when the first application is configured as a shared application while the second data a2 of the first application received from the server is downloaded, in step 1023, the controller may store the first data a1 of the first application in a sharing storage unit of a memory. The first data a1 of the first application stored in the sharing storage unit of the memory may have a size different from that of first data a1 of the first application received from the first electronic device.

In step 1025, the controller may generate the entire data of the first application by combining the first data a1 of the first application received from the first electronic device with the second data a2 of the first application received from the server.

In step 1009 in FIG. 10A, according to a result of the determination that the electronic device does not satisfy the executable condition for the first application, without receiving, from the first electronic device, first data of the first application and basic information of the first application (e.g., the name thereof), in step 1027, the controller may receive, from the first electronic device, a notification of a transmission failure of an application.

Referring to FIG. 10C, in step 1029, the controller may access the server and may send, to the server, a request for information of an electronic device having downloaded the entire data of the first application.

In step 1031, the controller may receive information of a third electronic device having downloaded the first application.

In step 1033, the controller may search for at least one neighboring electronic device through a scan operation. The controller may search for neighboring electronic devices by performing a scan operation through a second communication unit.

In step 1035, the controller may find a third electronic device corresponding to information of the third electronic device among the at least one electronic device found through a scan operation. When the third electronic device exists among the at least one electronic device found through the scan operation, in step 1037, the controller may send a connection request to the third electronic device and may be connected to the third electronic device. When the first and third electronic devices are included in the at least one electronic device found through the scan operation, the controller may exclude, from connection subjects, the first electronic device that transmitted a notification of a transmission failure of an application.

In step 1039, the controller may request the third electronic device to share the first application.

In step 1041, the controller may transmit installation information of a second electronic device to the first electronic device at a request of the third electronic device. When the third electronic device requests installation information of an electronic device in order to check whether the electronic device satisfies a condition for executing the first application, the controller may transmit, to the third electronic device, at least one piece of information among version information and compatibility information (e.g., API (OS) version and resolution) of the electronic device, as the installation information of the electronic device.

In step 1043, according to whether the electronic device satisfies the condition for executing the first application, the controller may determine whether first data of the first application and basic information of the first application (e.g., the name thereof) are to be received from the third electronic device.

In step 1043, according to a result of the determination that the electronic device satisfies the condition for executing the first application, when first data of the first application and basic information of the first application are received from the third electronic device, the controller may perform steps 1011 to 1025.

When, in step 1043, according to the result of the determination that the electronic device does not satisfy the condition for executing the first application, first data of the first application and basic information of the first application are not received from the third electronic device, and when a notification of a transmission failure of an application is received in step 1045, the controller may release the connection with the third electronic device.

Figure 11:
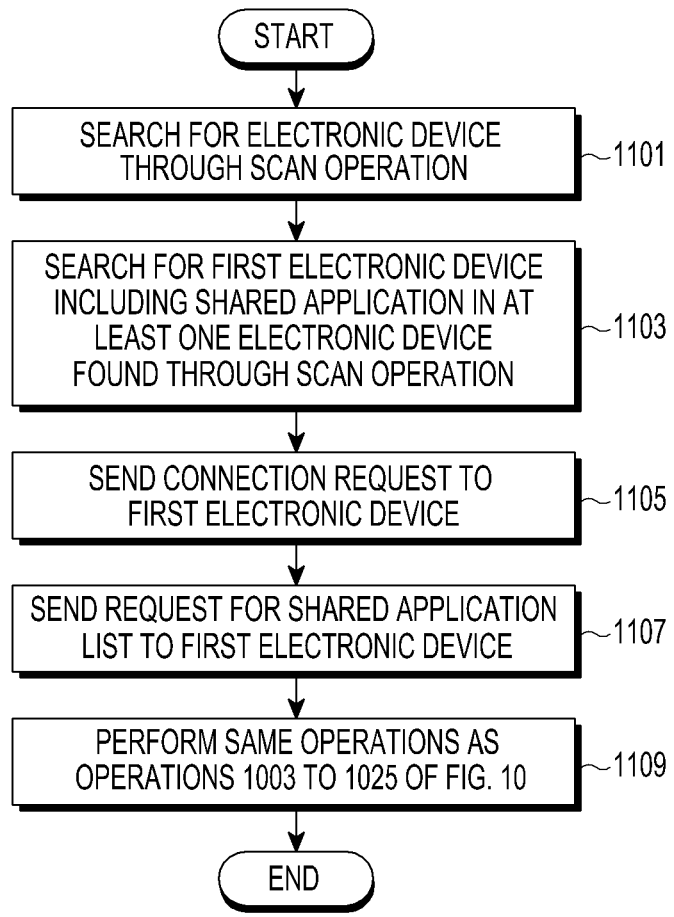
FIG. 11 is a flowchart of a method of downloading an application by an electronic device according to an embodiment of the present disclosure.

FIG. 11 is a flowchart of a method of downloading an application by an electronic device according to an embodiment of the present disclosure.

Referring to FIG. 11, in step 1101, a controller of the electronic device may search for neighboring electronic devices by performing a scan operation through a second communication unit in order to download an application.

In step 1103, the controller may detect a first electronic device including a shared application among the at least one electronic device found through a scan operation. The controller may detect a notification of the existence of a shared application from a beacon signal received from the at least one electronic device found through a scan operation. While the controller displays, on a display, the type of the found at least one electronic device, the controller may display an icon that provides the notification of the existence of the shared application, on at least one electronic device that transmitted a beacon signal including the notification of the existence of the shared application.

In step 1105, when a user selects a first electronic device from among the at least one electronic device that displays the icon that provides notification of the existence of the shared application, the controller may send a connection request to the first electronic device.

In step 1107, the controller may send a request for a shared application list to the first electronic device.

In step 1109, steps 1003 to 1025 described above with reference to FIG. 10 are performed, and thus, a description thereof is omitted here.

Figure 12:
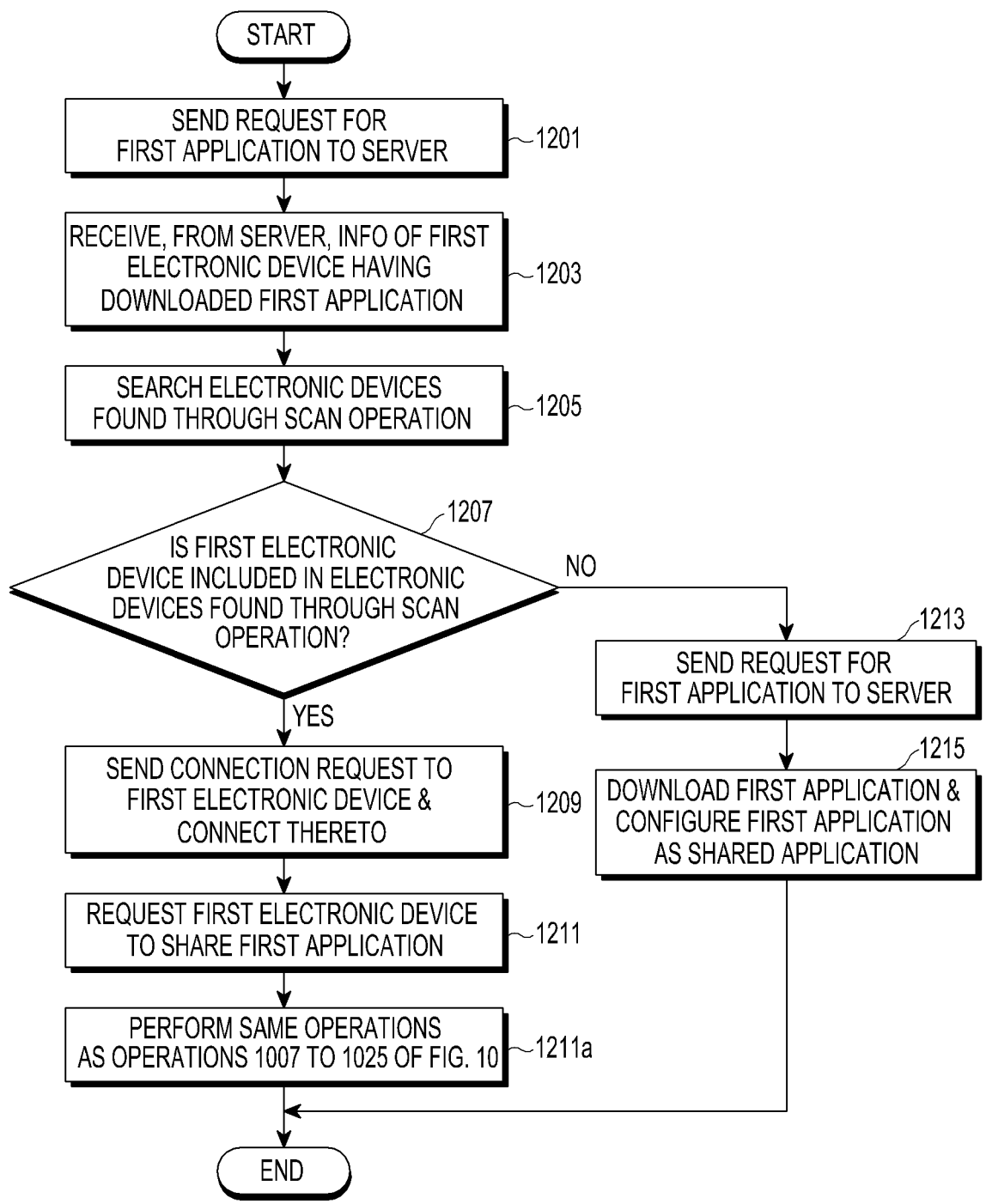
FIG. 12 is a flowchart of a method of downloading an application by an electronic device according to an embodiment of the present disclosure.

FIG. 12 is a flowchart of a method of downloading an application by an electronic device according to an embodiment of the present disclosure.

Referring to FIG. 12, in step 1201, a controller of the electronic device may access a server, and may send a request for downloading a first application to the server. In order to download the first application, the controller may access the server through a first communication unit, and may send a request for downloading the first application to the server.

In step 1203, the controller may receive, from the server, information of the first electronic device having downloaded the entire data of the first application.

In step 1205, the controller may search for neighboring electronic devices by performing a scan operation through a second communication unit.

In step 1207, the controller may determine whether the first electronic device is included in the electronic devices found through a scan operation. When the found electronic devices include the first electronic device, in step 1209, the controller may send a connection request to the first electronic device and may be connected to the first electronic device.

In step 1211, the controller may request the first electronic device to share the first application.

In step 1211a, steps 1007 to 1025 described above with reference to FIG. 10 are performed, and thus, a description thereof is omitted here.

In step 1207, when the found electronic devices do not include the first electronic device, in step 1213, the controller may access the server and may send a request for downloading the first application to the server.

In step 1215, when the first application is configured as a shared application while the first application received from the server is downloaded, the controller may store the entire data of the first application in a memory, and may separately store first data, which is partial data of the first application, in a sharing storage unit of the memory.

According to an embodiment of the present disclosure, an application sharing method of an electronic device may include receiving first data which is partial data of entire data of an application from a first electronic device; and when a user agrees to use condition information of an application received from a second electronic device, receiving second data which is remaining data of the entire data of the application from the second electronic device, and generating the application.

According to an embodiment of the present disclosure, receiving of the first data which is the partial data of the entire data of the application may include making a connection to the first electronic device; receiving a shared application list from the first electronic device; and sending, to the first electronic device, a request for an application selected in the shared application list.

According to an embodiment of the present disclosure, the application sharing method may further include transmitting installation information of the electronic device to the first electronic device at a request of the first electronic device; and when the electronic device satisfies an executable condition for the application based on the installation information of the electronic device, receiving the first data of the application from the first electronic device.

According to an embodiment of the present disclosure, the application sharing method may further include, when the electronic device does not satisfy the executable condition for the application based on the installation information of the electronic device, displaying a notification of a transmission failure of the application, and releasing a connection with the first electronic device.

According to an embodiment of the present disclosure, the receiving of the second data which is the remaining data of the entire data of the application may include sending a request for information of the application to the second electronic device; receiving use condition information of the application from the second electronic device at the request for the information of the application; and when the user of the electronic device agrees to the use condition information of the application, sending, to the second electronic device, a request for the second data of the application based on information of an application included in the use condition information of the application.

According to an embodiment of the present disclosure, the use condition information of the application may include at least one piece of information among a user's right, paid information, permission information, and application information.

According to an embodiment of the present disclosure, the application sharing method may further include sending a request for downloading the application to the second electronic device to; and when the application is configured as a shared application while the application is received and downloaded from the second electronic device, separately storing the first data of the entire data of the application.

According to an embodiment of the present disclosure, the application sharing method may further include when the entire data of the first application and the first data of the entire data of the first application are stored in the electronic device, transmitting a shared application list to the first electronic device; when the first electronic device requests the application, requesting installation information of the first electronic device; and when the installation information of the first electronic device received from the first electronic device satisfies an executable condition for the application, transmitting the first data of the first application to the first electronic device.

According to an embodiment of the present disclosure, the application sharing method may further include, when the installation information of the first electronic device does not satisfy the executable condition for the application, transmitting a notification of a transmission failure of the application to the first electronic device, and releasing the connection with the first electronic device.

According to an embodiment of the present disclosure, the application sharing method may further include when the electronic device stores the first data of entire data of a first application without storing the entire data of the first application, transmitting a shared application list to the first electronic device; and when the first electronic device requests the application, transmitting the first data of the first application to the first electronic device.

According to an embodiment of the present disclosure, in a storage medium storing instructions, the instructions may be configured to, when executed by at least one processor, cause the at least one processor to execute at least one operation, including receiving first data which is partial data of entire data of an application from a first electronic device; and when a user agrees to use condition information of an application received from a second electronic device, receiving second data which is remaining data of the entire data of the application from the second electronic device, and generating the application.

While the present disclosure has been shown and described with reference to certain embodiments thereof, it will be understood by those skilled in the art that various changes in form and details may be made therein without departing from the scope of the present disclosure, as defined by the appended claims and their equivalents.

What is claimed is:

1. An electronic device, comprising:
a display; and
a controller electrically connected to the display,
wherein the controller is configured to:
receive, from a first electronic device by using a peer to peer connection scheme, a request for operating system version information and compatibility information;
transmit, to the first electronic device, the operating system version information and the compatibility information;
based on the first electronic device verifying that the electronic device satisfies an installable condition of an application, receive, from the first electronic device by using the peer to peer connection scheme, first data which is partial data of entire data of the application, information on a name of the application, and information on a size of the first data;
send, to a second electronic device, a request for information of the application based on the information on the name of the application;
receive, from the second electronic device, use condition information of the application, the use condition information of the application including information on a size of the application;
identify a size of second data which is remaining data of the entire data of the application based on the information on the size of the first data and the information on the size of the application;
send to the second electronic device a request for the second data;

receive the second data from the second electronic device based on the use condition information of the application; and
generate the entire data of the application by combining the first data and the second data.

2. The electronic device of claim 1, wherein the controller is further configured to:
make a connection to the first electronic device; and
when a shared application list is received from the first electronic device, send, to the first electronic device, a request for an application selected in the shared application list.

3. The electronic device of claim 1, wherein the controller is further configured to:
when the electronic device does not satisfy the executable condition for the application based on the installation information of the electronic device,
display a notification of a transmission failure of the application and release the connection with the first electronic device.

4. The electronic device of claim 1, wherein the use condition information of the application comprises at least one piece of information among a user's right, paid information, permission information, and application information.

5. The electronic device of claim 1, wherein the controller is further configured to:
send a request for downloading the application to the second electronic device; and
when the application is configured as a shared application while the application is received and downloaded from the second electronic device, separately store the first data of the application.

6. The electronic device of claim 5, wherein the controller is further configured to:
when the entire data and the first data of the application are stored in the electronic device, transmit a shared application list to the first electronic device;
when the first electronic device requests reception of the application, request installation information of the first electronic device; and
when the installation information of the first electronic device received from the first electronic device satisfies an executable condition for the application, transmit the first data of the application to the first electronic device.

7. The electronic device of claim 5, wherein the controller is further configured to:
when the electronic device stores the first data of the application without storing the entire data of the application, transmit the first data of the application to the first electronic device.

8. A method of an electronic device, the method comprising:
receiving, from a first electronic device by using a peer to peer connection scheme, a request for operating system version information and compatibility information;
transmitting, to the first electronic device, the operating system version information and the compatibility information;
based on the first electronic device verifying that the electronic device satisfies an installable condition of an application, receiving, from the first electronic device by using the peer to peer connection scheme, first data which is partial data of entire data of the application, information on a name of the application, and information on a size of the first data;

sending, to a second electronic device, a request for information of the application based on the information on the name of the application;

receiving, from the second electronic device, use condition information of the application, the use condition information of the application including information on a size of the application;

identifying a size of second data which is remaining data of the entire data of the application based on the information on the size of the first data and the information on the size of the application;

sending, to the second electronic device, a request for the second data;

receiving the second data from the second electronic device based on the use condition information of the application; and generating the entire data of the application by combining the first data and the second data.

9. The method of claim 8, wherein receiving the first data of the application comprises:

making a connection to the first electronic device;

receiving a shared application list from the first electronic device; and sending, to the first electronic device, a request for an application selected in the shared application list.

10. The method of claim 8, further comprising, when the electronic device does not satisfy the executable condition for the application based on the installation information of the electronic device, displaying a notification of a transmission failure of the application, and releasing the connection with the first electronic device.

11. The method of claim 8, further comprising:

sending a request for downloading the application to the second electronic device to; and when the application is configured as a shared application while the application is received and downloaded from the second electronic device, separately storing the first data of the entire data of the application.

12. The method of claim 11, further comprising:

when the entire data and the first data of the application are stored in the electronic device, transmitting a shared application list to the first electronic device;

when the first electronic device requests the application, requesting installation information of the first electronic device; and when the installation information of the first electronic device received from the first electronic device satisfies an executable condition for the application, transmitting the first data of the application to the first electronic device.

13. The method of claim 12, further comprising when the installation information of the first electronic device does not satisfy the executable condition for the application, transmitting a notification of a transmission failure of the application to the first electronic device, and releasing a connection with the first electronic device.

14. The method of claim 11, further comprising:

when the electronic device stores the first data of the application without storing the entire data of the application, transmitting a shared application list to the first electronic device; and when the first electronic device requests the application, transmitting the first data of the application to the first electronic device.

* * * * *